US012810459B2

(12) United States Patent
Kelcey et al.

(10) Patent No.: US 12,810,459 B2
(45) Date of Patent: Nov. 24, 2026

(54) CONFIGURING AN OBJECT DETECTION SYSTEM FOR AN EMBEDDED DEVICE

(71) Applicant: EdgeImpulse Inc., San Jose, CA (US)

(72) Inventors: Matthew Kelcey, Melbourne (AU); Johannes Jongboom, Amsterdam (NL); Daniel Situnayake, Mt. Pleasant, SC (US); Arun Rajasekaran, Saratoga, CA (US)

(73) Assignee: EdgeImpulse, Inc., San Diego, CA (US)

( * ) Notice: Subject to any disclaimer, the term of this patent is extended or adjusted under 35 U.S.C. 154(b) by 613 days.

(21) Appl. No.: 17/972,784

(22) Filed: Oct. 25, 2022

(65) Prior Publication Data

US 2024/0135571 A1 Apr. 25, 2024
US 2024/0233164 A9 Jul. 11, 2024

(51) Int. Cl.
*G06T 7/11* (2017.01)
*G06T 1/20* (2006.01)
(Continued)

(52) U.S. Cl.
CPC .................. *G06T 7/70* (2017.01); *G06T 1/20* (2013.01); *G06T 7/11* (2017.01); *G06V 10/25* (2022.01);
(Continued)

(58) Field of Classification Search
CPC .... G06V 10/25; G06V 10/82; G06V 2201/07; G06V 10/255; G06T 7/70; G06T 1/20;
(Continued)

(56) References Cited

U.S. PATENT DOCUMENTS

2010/0082301 A1 4/2010 Skibiski et al.
2016/0164721 A1 6/2016 Zhang et al.
(Continued)

FOREIGN PATENT DOCUMENTS

EP 4174794 A1 5/2023

OTHER PUBLICATIONS

Johnston, Jordan. "Tutorial: Running Yolov5 Machine Learning Detection on a Raspberry Pi 4." Medium, Medium, Apr. 8, 2021, jordan-johnston271.medium.com/tutorial-running-yolov5-machine-learning-detection-on-a-raspberry-pi-4-3938add0f719. (Year: 2021).*
(Continued)

*Primary Examiner* — Amandeep Saini
*Assistant Examiner* — Jaspreet Kaur
(74) *Attorney, Agent, or Firm* — Polsinelli LLP

(57) ABSTRACT

An object detection system may be configured for an embedded device, such as a microcontroller. The object detection system may be configured to divide an image into multiple cells arranged in a grid. A cell of the multiple cells may map to a region of one or more pixels in the image. The object detection system may detect in each cell either a background or one of multiple objects that are detectable classes distinct from one another. The background may be detected when none of the multiple objects are detected. The one of the multiple objects may be detected when a centroid of the one of the multiple objects is detected. In some implementations, expected data may be detected in a cell when detecting the data within a range, and anomalous data may be detected in a cell when detecting the data outside of the range.

18 Claims, 25 Drawing Sheets

(51) Int. Cl.
*G06T 7/70* (2017.01)
*G06V 10/25* (2022.01)
*G06V 10/82* (2022.01)

(52) U.S. Cl.
CPC .......... *G06V 10/82* (2022.01); *G06V 2201/07* (2022.01)

(58) Field of Classification Search
CPC ..... G06T 7/11; G06T 3/4046; G06T 2210/12; G06N 3/0464
See application file for complete search history.

(56) References Cited

U.S. PATENT DOCUMENTS

| | | | |
|---|---|---|---|
| 2019/0012551 A1* | 1/2019 | Fung ................ | G08G 1/096708 |
| 2019/0073774 A1* | 3/2019 | Kwant .................... | G06T 7/143 |
| 2021/0326759 A1 | 10/2021 | Ardel et al. | |
| 2024/0031378 A1 | 1/2024 | Mendelowitz et al. | |
| 2024/0121252 A1 | 4/2024 | Ezrielev et al. | |
| 2024/0135149 A1 | 4/2024 | Kelcey | |

OTHER PUBLICATIONS

Hui, Jonathan. "Real-Time Object Detection with Yolo, Yolov2 and Now Yolov3." Medium, Medium, Mar. 17, 2018, jonathan-hui.medium.com/real-time-object-detection-with-yolo-yolov2-28b1b93e2088. (Year: 2018).*

Li, Wei, et al. "Summary of Target Detection Algorithms." IOP Science, Phys.: Conf. Ser. 1757 012003, 2021 iopscience.iop.org/article/10.1088/1742-6596/1757/1/012003. (Year: 2021).*

Kelcey, Mat. "Counting Bees on a Rasp Pi with a Conv Net" Brain of Mat Kelcey . . . , May 17, 2018, matpalm.com/blog/counting_bees/. (Year: 2018).*

Sudan Jha et al. Real time object detection and tracking system for video surveillance system. Multimed Tools Appl 80, 3981-3996 (2021). https://doi.org/10.1007/s11042-020-09749-x (Year: 2021).*

Z. Rahman, A. M. Ami and M. A. Ullah, "A Real-Time Wrong-Way Vehicle Detection Based on YOLO and Centroid Tracking," 2020 IEEE Region 10 Symposium (TENSYMP), Dhaka, Bangladesh, 2020, pp. 916-920, doi: 10.1109/TENSYMP50017.2020.9230463. ( Year: 2020).*

Datahacker.rs. "#025 CNN Bounding Box Predictions." Data Hacker, Datahacker, Nov. 24, 2018, datahacker.rs/deep-learning-bounding-boxes/. (Year: 2018).*

J. Redmon, S. Divvala, R. Girshick and A. Farhadi, "You Only Look Once: Unified, Real-Time Object Detection," 2016 IEEE Conference on Computer Vision and Pattern Recognition (CVPR), Las Vegas, NV, USA, 2016, pp. 779-788, doi: 10.1109/CVPR .2016.91 (Year: 2016).*

Shafiee, Mohammad Javad, et al. "Fast Yolo: A Fast You Only Look Once System for Real-Time Embedded Object Detection in Video." ArXiv.org, https://doi.org/10.48550/arXiv.1709.05943 (Year: 2017).*

Brain of Mat Kelcey; Counting Bees on a Rasp Pi with a Conv net; <http://matpalm.com/blog/counting_bees/>; May 17, 2018; Accessed Aug. 10, 2022; 7 pages.

Li H., et al., "An Improved YOLOv3 for Foreign Objects Detection of Transmission Lines", IEEE Access, May 2022, pp. 45620-45628.

Purohit H., et al., "Deep Autoencoding GMM-based Unsupervised Anomaly Detection in Acoustic Signals and Its Hyper-parameter Optimization", Detection and Classification of Acoustics Scenes and Events, Sep. 2020, 5 Pages.

Radke A.J., et al., ""Small Data" Anomaly Detection for Unmanned Systems", Sep. 2018, 7 Pages.

Zong B., et al., "Deep Autoencoding Gaussian Mixture Model for Unsupervised Anomaly Detection", May 2018, pp. 1-19.

* cited by examiner

1100

1200

2000

```
object_weight = 100

def weighted_xent(y_true, y_pred_logits):
        # run calculation of loss w.r.t weight of 1.0 then use mask to pick out
        # just background values.
        background_loss = tf.nn.weighted_cross_entropy_with_logits(
            labels=y_true, logits=y_pred_logits, pos_weight=1.0)
        background_loss *= background_loss_mask

        # rerun calculation of loss w.r.t weight of pos.weight then use mask to
        # pick out just non background values.
        non_background_loss = tf.nn.weighted_cross_entropy_with_logits(
            labels=y_true, logits=y_pred_logits, pos_weight=object_weight)
        non_background_loss *= 1.0 - background_loss_mask

        # overall loss is just the sum, averaged over all spatial dimensions
        losses = background_loss + non_background_loss
        return tf.reduce_mean(losses)
```

FIG. 20

CONFIGURING AN OBJECT DETECTION SYSTEM FOR AN EMBEDDED DEVICE

TECHNICAL FIELD

This disclosure relates generally to machine learning and, more specifically, to configuring an object detection system for an embedded device.

BACKGROUND

Machine learning, or artificial intelligence, refers to a system that uses data to perform tasks. A machine learning model may be built for a system based on training data (e.g., a dataset). The machine learning model may then be deployed to make predictions (e.g., predictions that an application can use to help guide decisions, such as predictions for image or sound classification), to generate data, and/or to transform data.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 20 is an example of a loss function that gives a greater weight to detecting one of multiple objects and a lesser weight to detecting a background.

DETAILED DESCRIPTION

Figure 1:
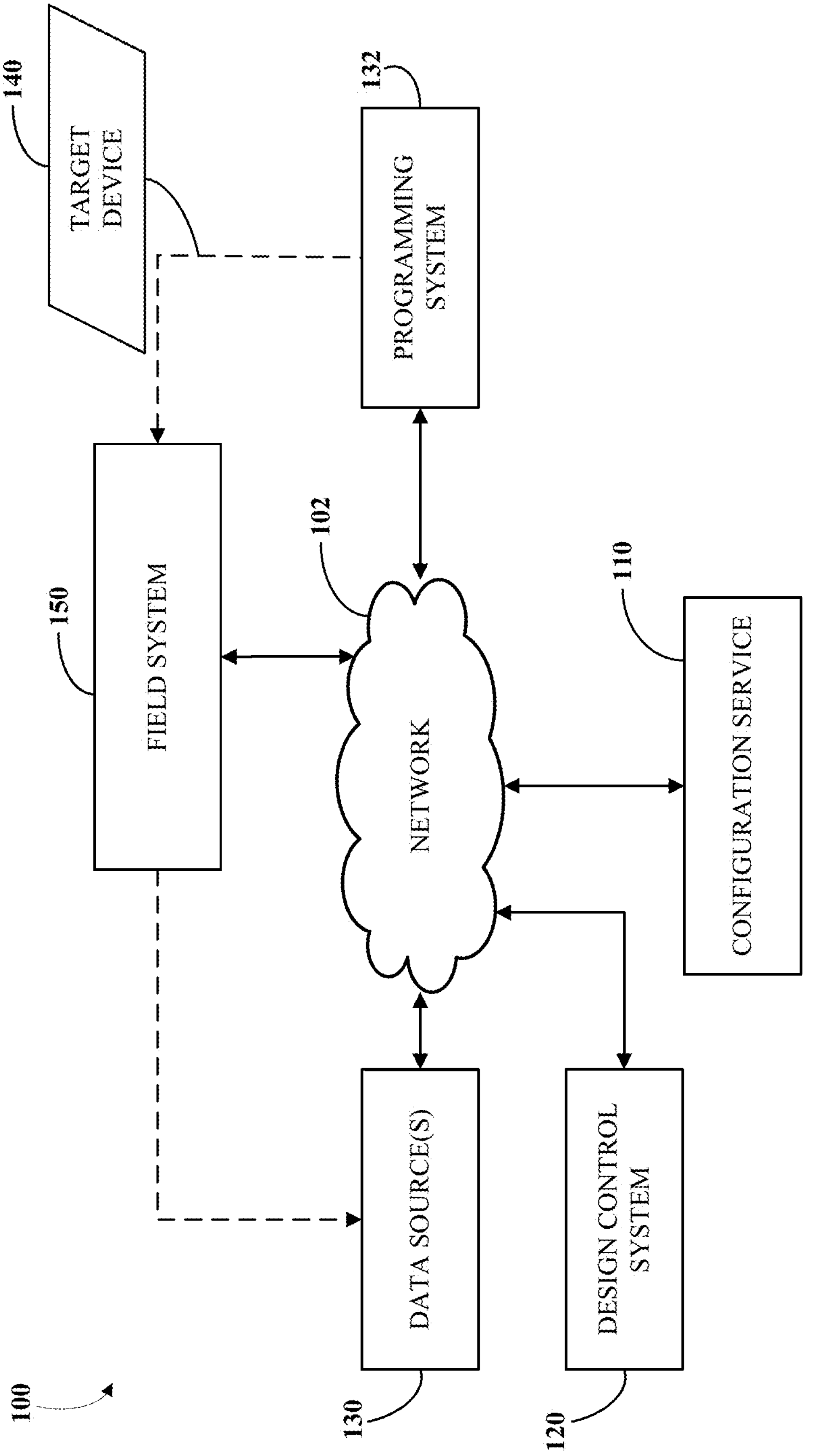
FIG. 1 is a block diagram of an example of a system for facilitating configuration and deployment of a pipeline.

Embedded machine learning permits an electronic device, such as a microcontroller, to implement a machine learning model to make predictions (e.g., that an application can use to help guide decisions), to generate data, and/or to transform data. For example, a device with embedded machine learning may receive a sample of data (e.g., input from a sensor) and may use a machine learning model to predict a result based on the sample without accessing software in the cloud. However, there are different ways a machine learning model may be configured for a given application. For example, the machine learning model may include an artificial neural network (or simply a "neural network"), and hyperparameters associated with the neural network may be configured in different ways to achieve different levels of accuracy and/or inference times.

Additionally, there may be constraints associated with a given application. For example, a machine learning model used to predict the busyness of a shopping center might tolerate a greater inference time (e.g., an amount of time for the machine learning model to process input data and produce output data, such as a prediction) than a machine learning model used to predict the movement of an unmanned aerial vehicle (UAV) that may be in flight. Further, there are different devices that could be used when implementing a machine learning model. For example, one device might be more complex with a processor that includes a more execution units, a deep learning accelerator, support for floating point (FP) instructions, and instruction and data caches, while another device might be less complex with a processor that includes a fewer execution units, a lack of support for FP instructions, and a lack of instruction and data caches. In some cases, the device that is more complex could have a heterogenous architecture that uses multiple types of processors and instruction sets. Moreover, the different devices might operate at different clock frequencies. Thus, the performance of such devices may vary.

Additionally, implementing the machine learning model on the different devices may involve utilizing different software toolchains, with the more complex devices sometimes involving more complex software in the toolchain that may be difficult for a user to configure. As a result, it may be time consuming and/or difficult for an engineer to configure a machine learning model for a given application and/or a given device, or for an engineer to port a given application onto multiple different devices. It is therefore desirable to implement a machine learning model for a given application and/or a given device while reducing the time and/or the burden associated with the implementation.

Implementations of this disclosure address problems such as these by receiving an input indicating a target device (e.g., a specified microcontroller, board, computer, or mobile phone) and automatically determining the performances of multiple configurations of a pipeline (sometimes referred to as machine learning pipeline or an impulse), based on the target device indicated by the input, for implementing a configuration of the multiple configurations on the target device. The pipeline may include one or more signal processing components (e.g., one or more components implementing a digital signal processing (DSP) algorithm) and one or more machine learning components (e.g., one or more components implementing conditional logic, a neural network, a heuristic algorithm, or other learning algorithm or classifier). The one or more signal processing components and the one or more machine learning components may be connected to one another in various ways.

A configuration of the pipeline may include one or more parameters for configuring the signal processing component (e.g., settings that affect signal processing calculations, such as a particular DSP algorithm or noise floor) and/or the machine learning component (e.g., settings that affect machine learning, such as hyperparameters including neural network topology, size, or training). Configurations of the multiple configurations may vary in the one or more parameters that are used, and therefore may vary in configurations of the one or more signal processing components and/or the one or more machine learning components. The performance of a configuration may be determined based on the target device, and the target device may be indicated by the input. For example, the target device may be indicated by a user via selection of the target device from a library of multiple possible target devices. The target device could be, for example, a device (e.g., a microcontroller or board), a computer, or a mobile phone. In some implementations, the target device could comprise a system running in a cloud server. The performance of a configuration may also be determined based on an application constraint (e.g., a targeted latency, accuracy, memory usage, and/or energy usage), and the application constraint may be indicated by an input. For example, the application constraint may be indicated by a user for meeting the needs of a given application (e.g., achieving a shorter inference time for predicting the movement of a UAV).

In some implementations, the performance of a configuration may be determined by calculating a latency (e.g., an inference time), a memory usage (e.g., a random access memory (RAM) and/or a read only memory (ROM) usage), an energy usage (e.g., power consumption), and/or level of accuracy associated with the configuration when implemented on the target device. For example, the latency, or inference time, may be an amount of time for the configuration of the pipeline to process input data and produce output data when the configuration is implemented on a target device; the memory usage may be a peak amount of RAM and/or a peak amount of ROM, measured in kilobytes or megabytes, consumed by the target device when implementing the configuration; the energy usage may be a peak amount of power, measured in watts, consumed by the target device when implementing the configuration; and the accuracy may be a fraction or percentage of predictions that the target device correctly determines when implementing the configuration. In some implementations, the performance (e.g., the latency, memory usage, energy usage, or accuracy) of a configuration may be determined by simulating the target device implementing the configuration (e.g., determining the performance based on characteristics of the target device, such as the architecture of a device). In some implementations, the performance of a configuration may be determined by referencing one or more benchmarks associated with the target device (e.g., predetermined performance data from a look up table or other data structure) and applying the one or more benchmarks to estimate the performance of the configuration when the target device implements the configuration. In some cases, a machine learning model or heuristic algorithm may be used to predict the performance of the configuration based on the one or more benchmarks. This may permit determining the performance more quickly when using benchmarks. In some implementations, the configurations may be ranked based on their performances. In some implementations, the performance of a configuration may be compared to an application constraint (e.g., a targeted latency, accuracy, memory usage, and/or energy usage) indicated by an input. In some implementations, a configuration may be selected, based on the configuration satisfying the application constraint, for implementing the configuration on the target device (e.g., a microcontroller or board implementing a given architecture). In some implementations, the configuration may be implemented on a target device by utilizing a software toolchain for the target device, such as for generating firmware. In some implementations, implementing the configuration on a target device may include determining portions of the pipeline to be implemented on various cores of a heterogenous device, and distributing a computational workload associated with the pipeline across the various cores. In some implementations, a graphical user interface (GUI) may be used when configuring the pipeline.

As a result, a pipeline including one or more signal processing components and one or more machine learning components may be determined for an application and/or a device while reducing the time and/or the burden associated with making the determination. Further, the pipeline may be implemented on a target device while reducing the time and/or the burden associated with utilizing the software toolchain for the target device. Additionally, by determining configurations that include signal processing and machine learning components, trade-offs between signal processing efficiency (e.g., utilization of the signal processing component) and machine learning efficiency (e.g., utilization of the machine learning component) may be achieved.

Further, computer vision is a scientific field that relates to how computers may be used to sense an environment from digital images or videos. Conventional systems that use computer vision generally perform object classification or object detection (e.g., image processing). With object classification, a system can receive an image as input and generate an output indicating a type of object that is detected in the image (e.g., a cat or a dog). Object classification generally works best for applications where there is only one object in the image (e.g., 1 cat or 1 dog). With object detection, a system can receive an image as input and generate an output indicating types of objects that are detected in the image (e.g., cats and dogs), numbers of objects in the image (e.g., 2 cats and 1 dog), positions of objects in the image (e.g., dog in lower left and first and second cats in lower right), and/or sizes of objects in the image (e.g., larger dog and smaller cats). Thus, object detection may be like object classification, but with more complex information included (e.g., location information).

Performing object detection generally involves detecting objects by determining bounding boxes associated with the objects in the image. While object detection may be more useful than object classification in some applications, object detection generally involves larger models (e.g., more neural network parameters) and more data (e.g., for training the neural network) due to the more complex information provided. As a result, it may be difficult for a target device that is constrained, such as an embedded device (e.g., a microcontroller) that is limited by power, processing speed, and/or memory available, to implement object detection while maintaining an acceptable level of performance for an application (e.g., processing a minimum number of images or frames per second). For example, a microcontroller implementing object detection may be limited to analyzing only two frames per second, which may be too slow for some applications, such as monitoring cats and dogs. In some cases, the performance may be improved by limiting the object detection to a single class of object (e.g., a dog or not a dog). However, a single object class may limit the usefulness of the object detection due to the limited information provided (e.g., by not including cats). It is therefore desirable to implement object detection, including for multiple objects, while maintaining a minimum level of performance when running on a microcontroller.

Implementations of this disclosure address problems such as these by configuring an object detection system (e.g., also referred to as faster objects/more objects, or FOMO) to provide object detection on an embedded device that is a constrained device (e.g., limited or constrained by power, processing speed, and/or memory) by performing discrete object classifications to detect centroids (e.g., as opposed to bounding boxes) of multiple objects (e.g., as opposed to a single object class) in regions of an image. A system may configure the object detection system for an embedded device, such as microcontroller. The object detection system may receive an image, for example, from a camera connected to the embedded device. The object detection system may divide, or segment, the image into multiple cells (e.g., segments) arranged in a grid. Each cell of the multiple cells may map to a region of one or more pixels that are adjacent in the image. The object detection system may then detect in each cell either a background or one of multiple objects (e.g., an object classification of N objects, where N is greater than one, plus the background). The background and the objects may be detectable classes that are distinct from one another (e.g., a cat, or a dog, or background). The object detection system may use a neural network (e.g., implemented by the machine learning component) for detecting the background or the one of the multiple objects in a cell. The neural network may be trained, for example, by a loss function that gives a greater weight to detecting one of the multiple objects and a lesser weight to detecting the background (e.g., balancing what is usually a majority of background in an image). The neural network may implement one or more convolutional layers (e.g., a first portion of a convolutional neural network (CNN), such as MobileNetV2) that, for each cell, reduces a resolution of the region of one or more pixels in the image (e.g., in a flow generally used to predict an object in the entire image). The background may be detected when none of the multiple objects are detected (e.g., the background may be an implicit class). The one of the multiple objects may be detected when a centroid of the one of the multiple objects is detected (e.g., detected without determining a bounding box for the object). As a result, the object detection system may provide object detection on an embedded device, such as microcontroller that is limited or constrained by power, processing speed, and/or memory, while maintaining a minimum level of performance (e.g., at least 10 frames per second).

In some implementations, the system may configure the object detection system to detect anomalies in datasets (e.g., an anomaly detection system, or anomaly detector). The anomaly detection system may detect, in each cell, data that is either expected data (e.g., the background or the one of the multiple objects) or anomalous data. For example, the anomaly detection system can compare the data to a statistical distribution (e.g., a bell curve) that is determined when training the neural network. The anomaly detection system can compare the data to the statistical distribution to determine an anomaly score based on a distance of the data from a mean of the curve (e.g., a range). A lesser distance (e.g., within the range) may indicate a lower anomaly score corresponding to expected data (e.g., non-anomalous), while a greater distance (e.g., outside of the range) may indicate a higher anomaly score corresponding to anomalous data. As a result, the accuracy of detecting data, such as the one of the multiple objects, may be improved.

In some implementations, the system may configure the object detection system to detect features in other types of datasets (e.g., a feature detection system, or feature detector). For example, the feature detection system could be configured to detect time-series data from various sensors, such as audio data from a microphone, acceleration data from an accelerometer, proximity data from a proximity sensor, motion-sensing data from a gyroscope, magnetic field data from a magnetometer, and/or ambient light data from an ambient light sensor.

FIG. 1 is a block diagram of an example of a system 100 for facilitating configuration and deployment of a pipeline. The system 100 may include a network 102, a configuration service 110 (e.g., a machine learning pipeline or impulse configuration service), a design control system 120, one or more data sources 130, a programming system 132, and/or a field system 150. A user may utilize the design control system 120 to command the configuration service 110 via network communications over the network 102. For example, a user may utilize a web client or a scripting application program interface (API) client that may be implemented by the design control system 120 to command the configuration service 110.

The configuration service 110 may be used to configure a pipeline to be implemented by a target device. The pipeline may include one or more signal processing components and one or more machine learning components that may be connected to one another in various ways. The target device may be indicated by a user, such as by selection of a target device from a library of multiple possible target devices. For example, the user may utilize the design control system 120 to indicate the selection of the target device to the configuration service 110. The target device could be, for example, a device (e.g., a microcontroller or board), a computer, or a mobile phone. In some implementations, the target device could comprise a system running in a cloud server.

The one or more data sources 130 may be used to provide input data (e.g., raw data) to the configuration service 110 via network communications over the network 102. The input data may be used by the configuration service 110 to generate one or more datasets that may be used to configure, train, and/or test a configuration of the pipeline. The one or more data sources 130 could be selected and/or configured by the user via the design control system 120. The one or more data sources 130 could also be configured by the configuration service 110 for transferring the input data from the one or more data sources 130 to the configuration service 110. The one or more data sources 130 may include, for example, one or more servers, computers, mobile phones, or other electronic devices, such as microcontrollers or boards.

The configuration service 110 may deploy a configuration of the pipeline to a target device 140. In some implementations, the target device 140 could be a device, such as a microcontroller or board. The configuration service 110 may communicate with the programming system 132 via network communications over the network 102 to program the target device 140 (e.g., the device). For example, the configuration service 110 may generate software and/or firmware for deploying the configuration of the pipeline. The configuration service 110 may communicate with the programming system 132 to send the software and/or firmware to the programming system 132. The programming system 132 may use the software and/or firmware to program the target device 140 (e.g., the configuration service 110 may generate a binary that the programming system 132 may use to flash, or program the ROM, of the device). Thus, the target device 140, when programmed, may implement a configuration of the pipeline that may be used for machine learning on a target device having constraints (e.g., embedded machine learning).

In some implementations, the target device 140 could be a computer or a mobile phone. The configuration service 110 may communicate with the computer or the mobile phone, via network communications over the network 102, to program the computer or the mobile phone. For example, the configuration service 110 may generate software for deploying the configuration of the pipeline to the computer or the mobile phone. The configuration service 110 may communicate with the computer or the mobile phone to send the software to the computer or the mobile phone for the computer or the mobile phone to execute. Thus, the computer or the mobile phone, when using the software, may implement a configuration of the pipeline that may be used for machine learning on a target having constraints (e.g., embedded machine learning). In some cases, the configuration service 110 may generate software for deploying the configuration of the pipeline to a library. A computer or other device, such as the target device 140, may use the library to implement a configuration of the pipeline.

In some implementations, the target device 140 may be implemented in the field system 150. The field system could be an intelligent device that uses the target device 140 to make predictions that can help guide decisions for an application. For example, the field system 150 could be an edge device, a medical device, a wearable device, or other device including a processor.

In some implementations, the field system 150, implementing the target device 140, may also serve as a data source like the one or more data sources 130. For example, the target device 140 may be used to provide input data to the configuration service 110, via the field system 150 and network communications over the network 102. The configuration service 110 may use the input data from the target device 140, like input data from the one or more data sources 130, to configure, train, and/or test a pipeline implemented by the target device 140 and/or another pipeline to be implemented by another target device.

Figure 2:
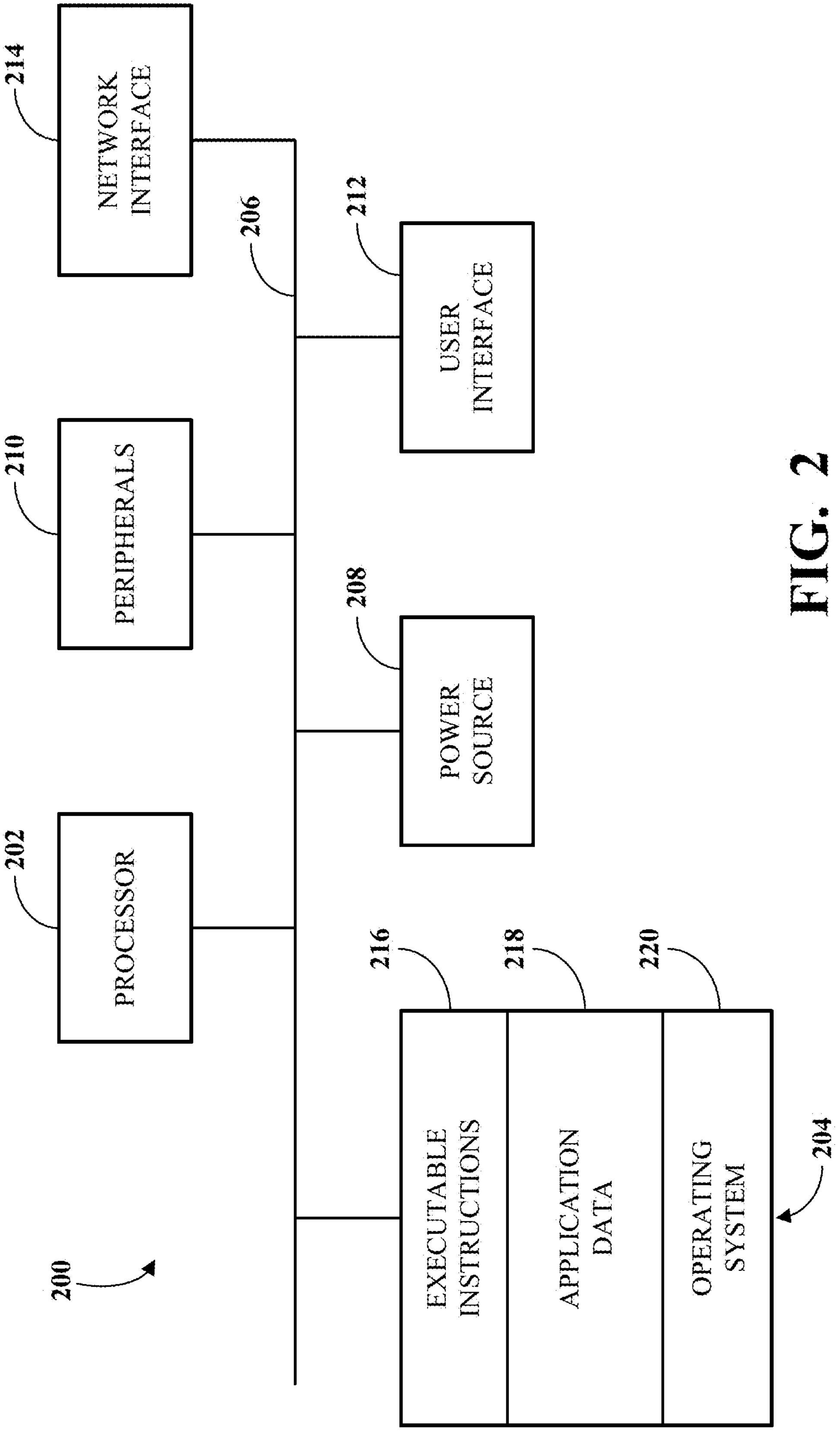
FIG. 2 is a block diagram of an example internal configuration of a computing device for facilitating configuration and deployment of a pipeline.

FIG. 2 is a block diagram of an example internal configuration of a computing device 200 for facilitating configuration and deployment of a pipeline. The computing device 200 may implement one or more of the configuration service 110, the design control system 120, the one or more data sources 130, the programming system 132, the target device 140, or the field system 150 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a dynamic random access memory (DRAM) module, such as double data rate (DDR) synchronous DRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220, when present, can be, for example, Microsoft Windows®, Mac OS X®, or Linux®; an operating system for a mobile device, such as a smartphone or tablet device; or an operating system for a non-mobile device, such as a mainframe computer. For example, a target device that is an embedded device might not have an operating system.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 102 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
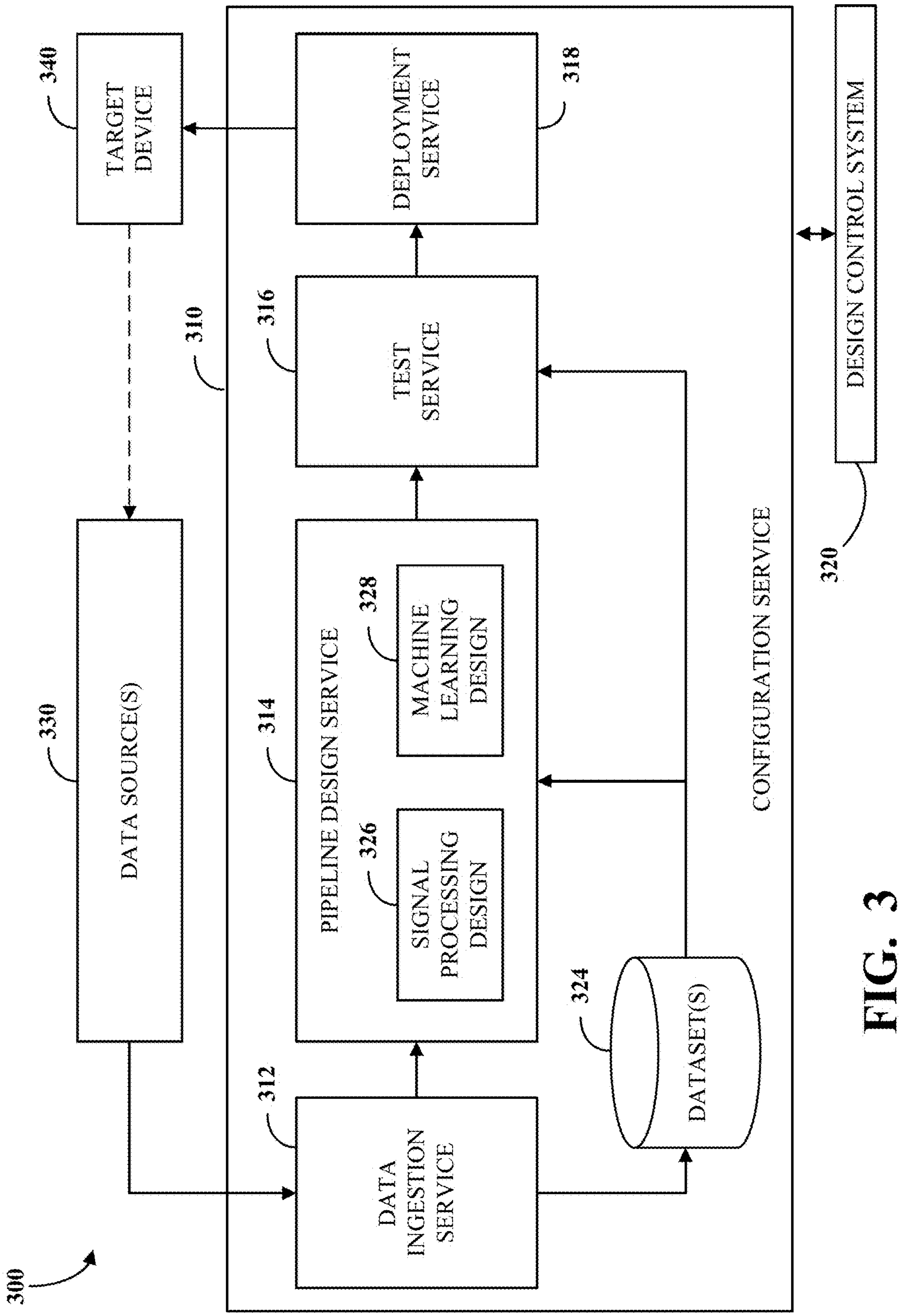
FIG. 3 is a block diagram of an example of a system for configuring a pipeline including a signal processing component and a machine learning component.

FIG. 3 is a block diagram of an example of a system 300 for configuring a pipeline including a signal processing component and a machine learning component. The system 300 may include a configuration service 310, a design control system 320, one or more data sources 330, and a target device 340 like the configuration service 110, the design control system 120, the one or more data sources 130, and the target device 140 shown in FIG. 1, respectively.

The configuration service 310 may be a software platform instantiated using one or more servers at one or more datacenters. The configuration service 310 may include a data ingestion service 312, a pipeline design service 314, a test service 316, and a deployment service 318. The data ingestion service 312 may receive input data from the one or more data sources 330. The input data may be used by the configuration service 310 to generate one or more datasets that may be used to configure, train, and/or test a configuration of the pipeline. The one or more datasets may be stored by the configuration service 310 in a database 324. The one or more data sources 330 could be selected and/or configured by the user via the design control system 320. The one or more data sources 330 could also be configured by the configuration service 310, such as for transferring the input data from the one or more data sources 330 to the configuration service 310. The one or more data sources 330 may include, for example, one or more servers, computers, mobile phones, or other electronic devices, such as microcontrollers or boards.

The pipeline design service 314 may be used to configure one or more configurations of a pipeline (e.g., a machine learning pipeline or impulse) to be implemented on the target device 340 (e.g., a specified microcontroller, board, computer, or mobile phone). The pipeline design service 314 may utilize a signal processing design service 326 and/or a machine learning design service 328 to configure a configuration of the pipeline. The signal processing design service 326 may be used to configure one or more signal processing components (e.g., one or more components implementing a DSP algorithm) for the pipeline. The machine learning design service 328 may be used to configure one or more machine learning components (e.g., one or more components implementing conditional logic, a neural network, a heuristic algorithm, or other learning algorithm, such as a classifier) for the pipeline. The signal processing components and the machine learning components may be connected to one another in various ways by the pipeline design service 314 (e.g., in series or in parallel). In one example, a signal processing component may be arranged in a first stage to pre-process data, followed by a machine learning component arranged in a second stage in series to process data. In another example, a first signal processing component may be arranged in a first stage to pre-process data, followed by a second signal processing component arranged in a second stage in series to further pre-process data, followed by a machine learning component arranged in a third stage in series to process data (e.g., multiple signal processing components). In another example, a signal processing component may be arranged in a first stage to pre-process data, followed by a first machine learning component arranged in a second stage in series to process data, followed by a second machine learning component arranged in a third stage in series to post-process data (e.g., multiple machine learning components). In some cases, the one or more signal processing components and/or the one or more machine learning components may be connected in parallel. For example, in a first stage, a first signal processing component may pre-process data in a first path and a second signal processing component may pre-process data in a second path, in a second stage, a first machine learning component may process data from the first signal processing component in the first path and a second machine learning component may process data from the second signal processing component in the second path, and in a third stage, a third machine learning component may post-process data from the first machine learning component and the second machine learning component in the second stage. Thus, the pipeline design service 314 may permit one or more signal processing components and one or more machine learning components to be connected to one another in various ways.

Various parameters may be used to configure a configuration of the pipeline. The signal processing design service 326 may determine the parameters for configuring the one or more signal processing components, and the machine learning design service 328 may determine the parameters for configuring the one or more machine learning components. Examples of parameters for configuring a processing component may include selection of a DSP algorithm (e.g., Mel-filterbank energy (MFE), Mel frequency cepstral coefficients (MFCC), or spectrogram), frame length, frame stride, frequency bands, and normalization or noise floor. Examples of parameters for configuring a machine learning component may include selection of a learning process (e.g., conditional logic, neural network, heuristic algorithm, or other learning algorithm, such as a classifier), and hyperparameters, such as number of training cycles, learning rate, validation set size, neural network topology, neural network size, types of layers, and order of layers. For example, parameters for a neural network may configure layers as dense, 1D convolution, or 2D convolution, and/or to reshape, flatten, and/or dropout. In some implementations, the pipeline design service 314 (e.g., the signal processing design service 326 and/or the machine learning design service 328) may determine the parameters based on user input of parameters, the target device 340, an application constraint (e.g., a targeted latency, accuracy, memory usage, and/or energy usage), and/or datasets stored in the database 324. One or more of the user input of parameters, the target device 340, the application constraint, and/or the datasets may be indicated by input from a user, such as via the design control system 320. One or more parameters may be specified and/or modified by a user, such as via the design control system 320.

The test service 316 may be used to test the one or more configurations of the pipeline. In some implementations, the test service 316 may use data from datasets stored in the database 324 to test the or more configurations of the pipeline to generate feedback. For example, the test service 316 may test the one or more configurations with respect to latency (e.g., inference time), level of accuracy of predictions, memory usage (e.g., RAM and/or ROM), and/or energy usage (e.g., power consumption). The test service 316 may provide such feedback to a user, via the design control system 320, so that the user may accept or change a configuration of the pipeline based on the testing. In some implementations, the test service 316 may use the feedback to identify one or more parts of the configuration of the pipeline (e.g., a signal processing component or a machine learning component) to change.

The deployment service 318 may be used to deploy a configuration of the pipeline to the target device 340. The target device 340 may be indicated by a user via the design control system 320. In some implementations, the target device 340 may be indicated by a selection of the target device 340 from a library of multiple possible target devices. The target device 340 could be, for example, a device (e.g., a microcontroller or board), a computer, or a mobile phone. In some implementations, the target device 340 could comprise a system running in a cloud server. The deployment service 318 may utilize a software toolchain, specific to the target device 340, for generating software and/or firmware for deploying the configuration of the pipeline to the target device 340. For example, a software toolchain may include a set of programming tools (e.g., a compiler, linker, libraries, and debugger) provided by a manufacturer or vendor for programming a particular device, library, computer, or mobile phone.

In some implementations, the deployment service 318 may communicate with a programming system (e.g., the programming system 132) to send the software and/or firmware to the programming system for programming the target device 340. For example, the deployment service 318 may generate a binary that may be used to flash, or program the ROM, of a device corresponding to the target device 340. Thus, the target device 340, when programmed, may implement a configuration of the pipeline that may be used for machine learning on a target having constraints, such as in a field system like the field system 150 shown in FIG. 1. For example, the target device 340 could be an embedded device that implements embedded machine learning in the field system 150.

Thus, there may be different ways a pipeline may be configured on the target device 340. Additionally, there may be constraints associated with the target device 340, such as memory usage (e.g., RAM and/or ROM availability by the target device 340) and/or energy usage (e.g., power limitations of the target device 340), and constraints associated with application of the target device 340 in the field, such as latency (e.g., inference time) and/or level of accuracy (e.g., predictions). Further, target devices may differ from one another with respect to implementing the pipeline (e.g., the software toolchains involved to implement a configuration of the pipeline on a target device may differ), with more complex target devices sometimes involving a more complex implementation. Further, target devices may differ from one another with respect to performance (e.g., some target devices may inherently perform better than others, such as devices having more execution units and higher clock frequencies performing better than devices having fewer execution units and lower clock frequencies).

Implementations of this disclosure permit automatically determining the performances of multiple configurations of a pipeline for implementation on the target device 340. The configuration service 310 may receive input, such as selection of the target device 340, selection of application constraints (e.g., a targeted latency, accuracy, memory usage, and/or energy usage), selection of one or more data sources 330, selection of input data, and/or selection of one or more parameters. The input may be provided by a user via the design control system 320. The configuration service 310 may execute to generate multiple configurations of a pipeline based on the input (e.g., selection of the target device 340, the application constraints, the input data, and/or the one or more parameters). The multiple configurations may vary in the parameters that are used, including parameters that may be specified by the user, and therefore may vary in configurations of the one or more signal processing components (e.g., configured by the signal processing design service 326) and/or the one or more machine learning components (e.g., configured by the machine learning design service 328). Thus, the performance of a first configuration of the pipeline that may be implemented on the target device 340 may vary from the performance of a second configuration of the pipeline of the pipeline that may be implemented on the target device 340. The configuration service 310 may execute to determine the performances of the multiple configurations of the pipeline that it determines based on the input (e.g., selection of the target device 340, the application constraints, the input data, and/or the one or more parameters). The performances of the multiple configurations may be determined, for example, by calculating latencies (e.g., inference times), memory usage (e.g., RAM and/or ROM usage), energy usage (e.g., power consumption), and/or levels of accuracy associated with the configurations when implemented on the target device 340.

In some implementations, the performance of a configuration may be determined by simulating the target device 340 implementing the configuration. This may permit determining the performance based on characteristics of the target device 340, such as the particular architecture implemented by the target device 340. For example, simulating the target device 340 may include executing compiled code (e.g., computer instructions) implementing the pipeline on a virtual version of the target device 340. In some implementations, the performance of a configuration may be determined by referencing one or more benchmarks associated with the target device 340 (e.g., predetermined performance data from a look up table or other data structure) and applying the one or more benchmarks to estimate the performance of the configuration when the target device 340 implements the configuration. In some cases, a machine learning model or heuristic algorithm may be used to predict the performance of the configuration based on the one or more benchmarks. This may permit determining the performance more quickly when using benchmarks. In some implementations, the configurations may be ranked based on their performances with their relative rankings displayed to a GUI. In some implementations, the performance of a configuration may be compared to an application constraint (e.g., a targeted latency, accuracy, memory usage, and/or energy usage) indicated by an input and displayed to a GUI. In some implementations, a configuration may be selected, based on the configuration satisfying the application constraint, for implementing the configuration on the target device 340 (e.g., a microcontroller or board implementing a given architecture). In some implementations, the configuration may be implemented on the target device 340 by utilizing a software toolchain for the target device 340, such as for generating software and/or firmware that is specific to the target device 340. In some implementations, implementing the configuration on the target device 340 may include determining portions of the pipeline to be implemented on various cores of a heterogenous device (e.g., a device including multiple types of processors and instruction sets), and may include distributing a computational workload associated with the pipeline across the various cores. In some implementations, a GUI may be used when configuring the pipeline, such as a GUI displayed to a user via the design control system 320.

Figure 4:
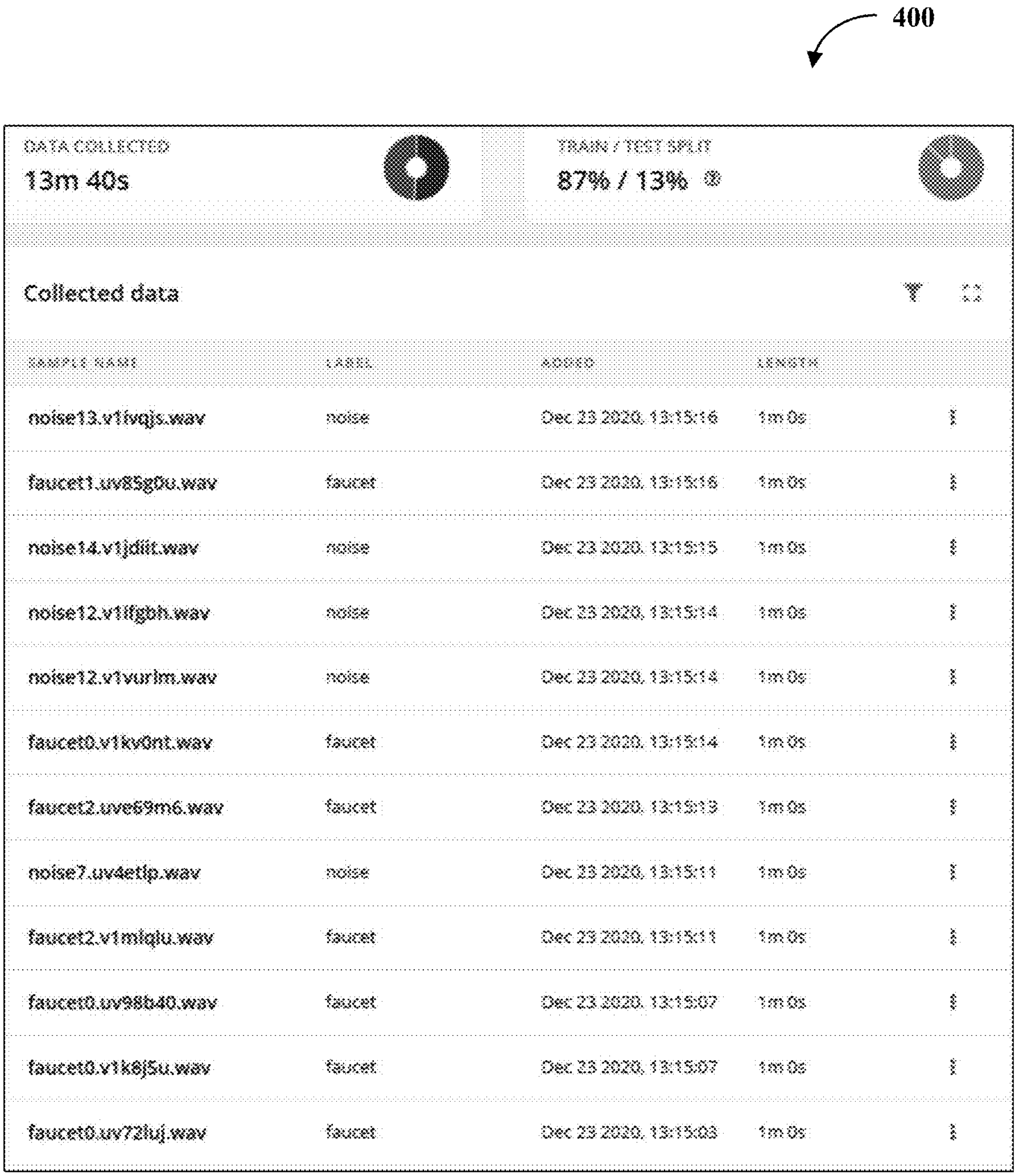
FIG. 4 is an illustration of an example of a graphical user interface (GUI) indicating data acquired from data source(s).

FIG. 4 is an illustration of an example of a GUI 400 indicating data acquired from data source(s) (e.g., the one or more data sources 330). The GUI 400 could be output for display at a user interface like the user interface 212 shown in FIG. 2. For example, the GUI 400 could be output for display to a user at the design control system 320 shown in FIG. 3. The information associated with the GUI 400 may be accessible via an API.

The GUI 400 may indicate data acquired, by the data ingestion service 312, from the one or more data sources 330 shown in FIG. 3. The data acquired (or "collected data") may comprise input data with associated labels for machine learning. For example, the collected data may include audio files that are labeled "faucet" or "noise" for training a configuration of the pipeline to classify a sound as either "faucet," indicating a sound of water running from a faucet, or "noise," indicating a sound other than water running from a faucet. The input data may be processed by the data ingestion service 312 and stored as one or more datasets in the database 324. The data ingestion service 312 may split the input data into a first amount for training the pipeline (e.g., 87%) and a second amount for testing the pipeline (e.g., 13%). In some implementations, the data ingestion service 312 may determine a default for the train/test split, and a user may change the default via the design control system 320.

Figure 5:
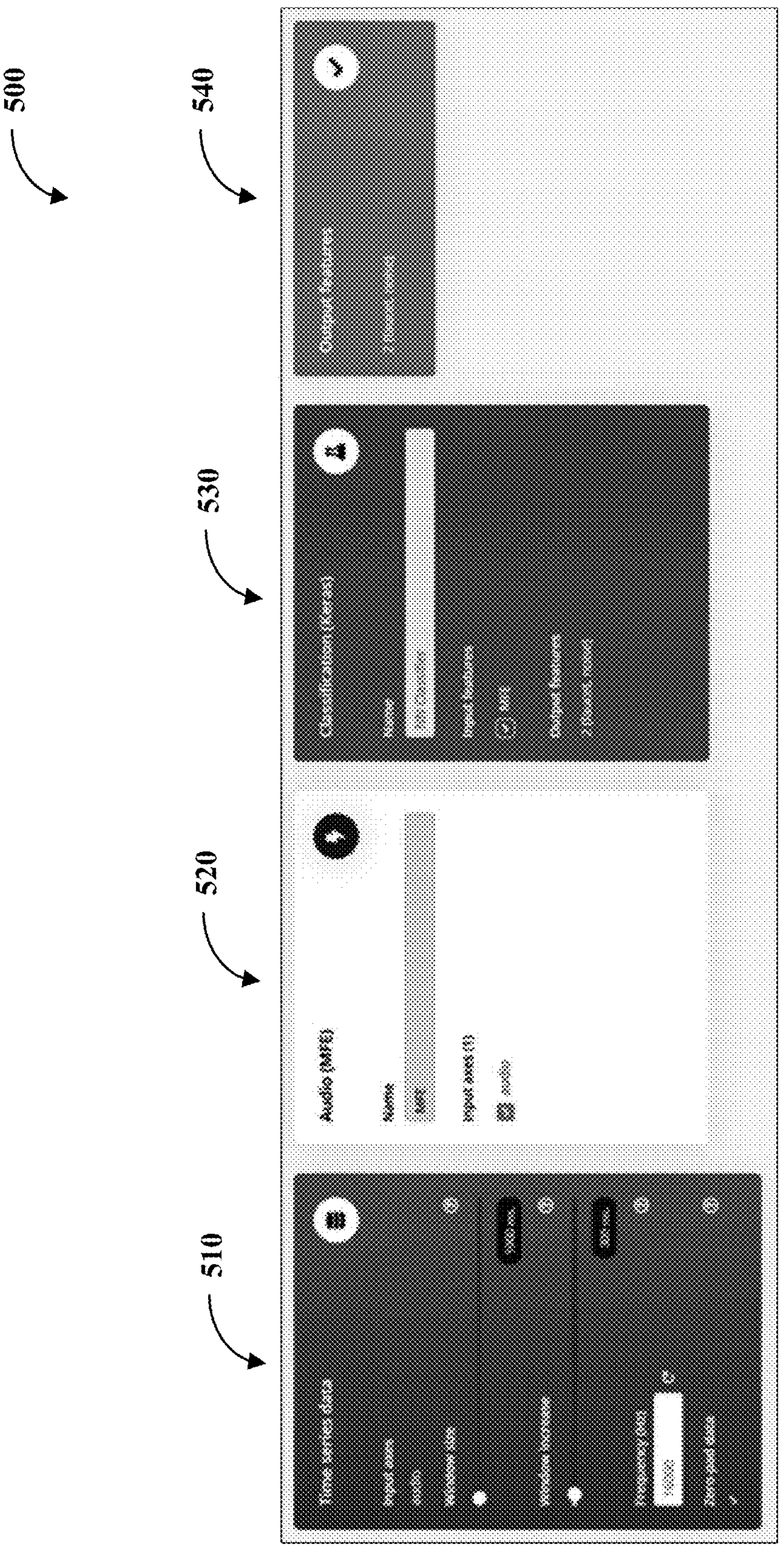
FIG. 5 is an illustration of an example of a GUI indicating configuration of a pipeline.

FIG. 5 is an illustration of an example of a GUI 500 indicating a configuration of a pipeline. The GUI 500 could be output for display at a user interface like the user interface 212 shown in FIG. 2. For example, the GUI 500 could be output for display to a user at a design control system like the design control system 320 shown in FIG. 3. The GUI 500 may be used to configure a pipeline (e.g., an impulse) for implementation on a target device (e.g., the target device 340). The information associated with the GUI 500 may be accessible via an API.

An input block 510 may indicate an input configuration, based on parameters, of the input data (e.g., images or time series, such as audio, vibration, or movements) from the one or more data sources (e.g., the one or more data sources 330). The input data may be processed by the data ingestion service 312, to produce one or more datasets, according to the input configuration (e.g., input axes for listing each axis referenced from the training dataset, window size defining the size of the raw features used for the training, window increase to extract multiple overlapping windows from a single sample, and frequency for sampling data). In some implementations, the data ingestion service 312 may determine a default for the input configuration, and the default may be modified by a user via the input block 510. A signal processing block 520 may indicate a signal processing configuration, based on parameters, for the signal processing design service 326. The signal processing configuration may be used by the signal processing design service 326 to generate the one or more signal processing components. In some implementations, the signal processing block 520 may determine a default for the signal processing configuration, and the default may be modified by a user via the signal processing block 520. A machine learning block 530 may indicate a machine learning configuration, based on parameters, for the machine learning design service 328. The machine learning configuration may be used by the machine learning design service 328 to generate the one or more machine learning components. In some implementations, the machine learning design service 328 may determine a default for the machine learning configuration, and the default may be modified by a user via the machine learning block 530. An output block 540 may indicate an output configuration, based on parameters, for the output of the pipeline (e.g., output data, such as classifying a data sample as "faucet," indicating a sound of water running from a faucet, or "noise," indicating a sound other than water running from a faucet.). In some implementations, the pipeline design service 314 may determine a default for the output configuration, and the default may be modified by a user via the output block 540.

The GUI 500 may permit one or more signal processing components (e.g., via the signal processing block 520) and the machine learning components (e.g., via the machine learning block 530) to be connected to one another in various ways (e.g., in series or in parallel). In one example, a signal processing component may be arranged in a first stage to pre-process data, followed by a machine learning component arranged in a second stage in series to process data. In another example, a first signal processing component may be arranged in a first stage to pre-process data, followed by a second signal processing component arranged in a second stage in series to further pre-process data, followed by a machine learning component arranged in a third stage in series to process data (e.g., multiple signal processing components). In another example, a signal processing component may be arranged in a first stage to pre-process data, followed by a first machine learning component arranged in a second stage in series to process data, followed by a second machine learning component arranged in a third stage in series to post-process data (e.g., multiple machine learning components). In some cases, the one or more signal processing components and/or the one or more machine learning components may be connected in parallel. For example, in a first stage, a first signal processing component may pre-process data in a first path and a second signal processing component may pre-process data in a second path, in a second stage, a first machine learning component may process data from the first signal processing component in the first path and a second machine learning component may process data from the second signal processing component in the second path, and in a third stage, a third machine learning component may post-process data from the first machine learning component and the second machine learning component in the second stage. Thus, the GUI 500 (e.g., via the pipeline design service 314) may permit one or more signal processing components and one or more machine learning components to be connected to one another in various ways.

Figure 6:
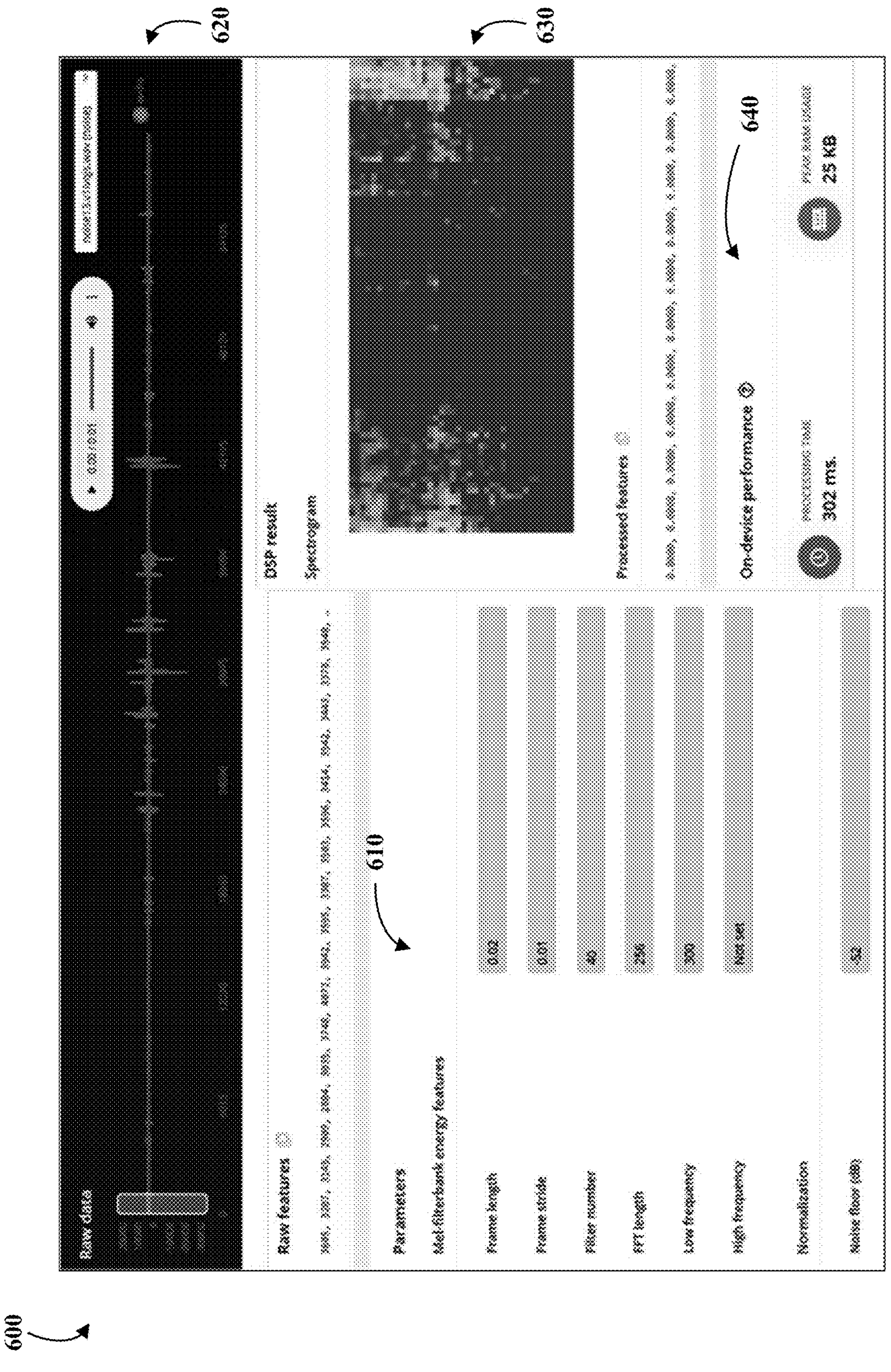
FIG. 6 is an illustration of an example of a GUI indicating configuration of a signal processing component of a pipeline.

FIG. 6 is an illustration of an example of a GUI 600 indicating a configuration, based on parameters, of a signal processing component of a pipeline. The GUI 600 could be output for display at a user interface like the user interface 212 shown in FIG. 2. For example, the GUI 600 could be output for display to a user at a design control system like the design control system 320 shown in FIG. 3. In some cases, selecting the signal processing block 520 shown in FIG. 5 may cause display of the GUI 600. The information associated with the GUI 600 may be accessible via an API The GUI 600 may include parameters 610 for the signal processing design service 326 to generate one or more signal processing components. The parameters 610 may permit selections of a DSP algorithm (e.g., MFE, MFCC, or spectrogram), frame length, frame stride, frequency bands, filter number, fast Fourier transform (FFT) length, low frequency, high frequency, and normalization or noise floor. The signal processing design service 326 may generate a signal processing component based on the parameters 610. A user may change one or more of the parameters 610 in the GUI 600, such as via the design control system 320.

To assist in the configuration, the GUI 600 may permit review of input data (e.g., processed by the data ingestion service 312), and features associated with the input data, via a waveform 620. The GUI 600 may also permit review of signal processing results (e.g., pre-processed data), from the signal processing component as configured, via a signal processing map 630. The GUI 600 may also indicate performance 640 (e.g., processing time and peak memory usage, such as RAM) of the signal processing component as configured. For example, the performance 640 may be determined by the signal processing design service 326, based on input (e.g., selection of the target device 340, the application constraints, the input data, and/or the one or more parameters), via simulations and/or benchmarks.

Figure 7:
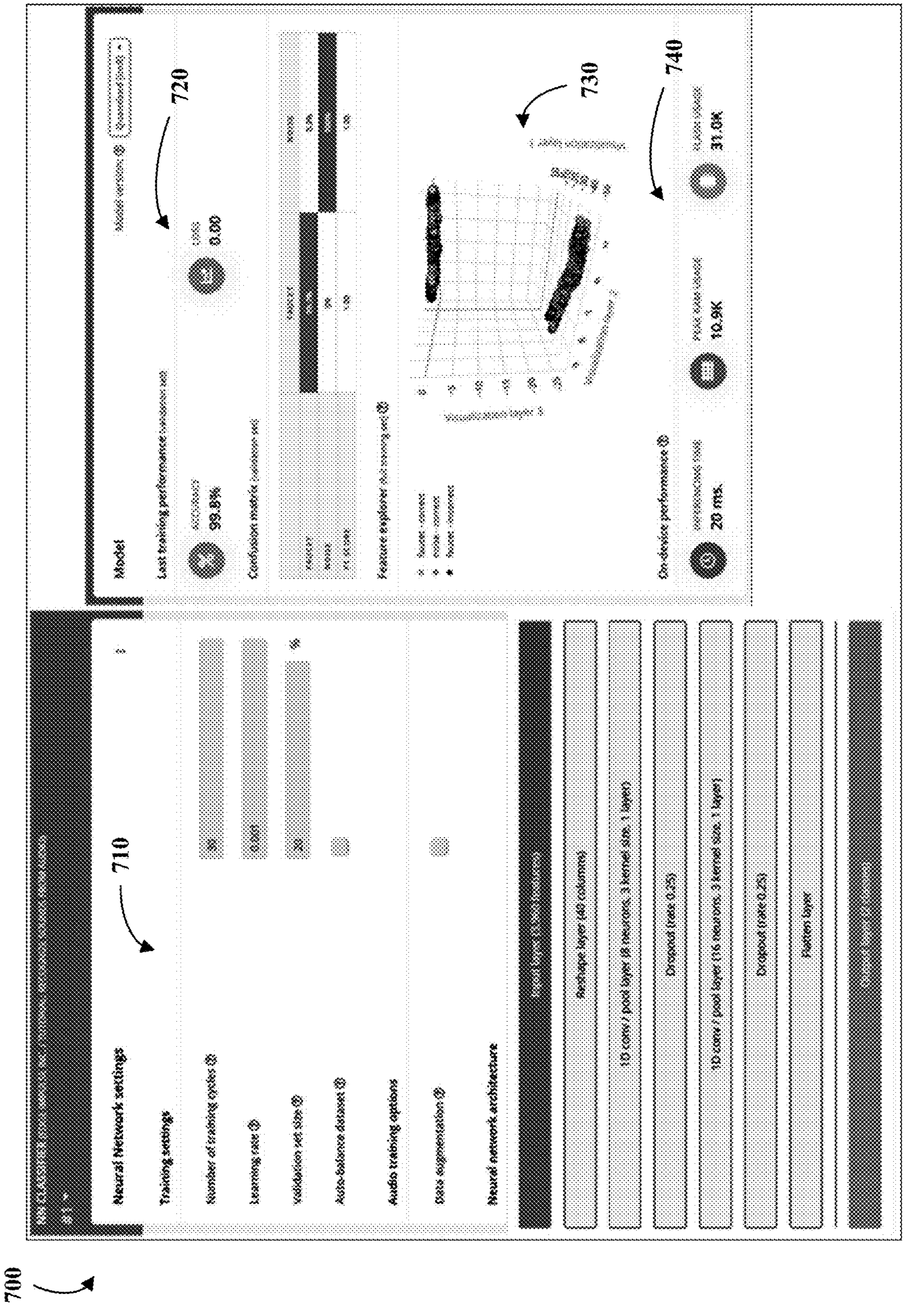
FIG. 7 is an illustration of an example of a GUI indicating configuration of a machine learning component of a pipeline.

FIG. 7 is an illustration of an example of a GUI 700 indicating a configuration, based on parameters, of a machine learning component of a pipeline. The GUI 700 could be output for display at a user interface like the user interface 212 shown in FIG. 2. For example, the GUI 700 could be output for display to a user at a design control system like the design control system 320 shown in FIG. 3. In some cases, selecting the machine learning block 530 shown in FIG. 5 may cause display of the GUI 700. The information associated with the GUI 700 may be accessible via an API The GUI 700 may include parameters 710 for the machine learning design service 328 to generate one or more machine learning components. The parameters 710 may permit selections of a learning process (e.g., conditional logic, neural network, heuristic algorithm, or other learning algorithm, such as a classifier), and hyperparameters, such as number of training cycles, learning rate, validation set size, neural network topology, neural network size, types of layers, and order of layers. The machine learning design service 328 may generate a machine learning component based on the parameters 710. A user may change one or more of the parameters 710 in the GUI 700, such as via the design control system 320.

To assist in the configuration, the GUI 700 may permit review of machine learning results 720 (e.g., processed data), from the machine learning component as configured, such as by displaying a determined level of accuracy, a confusion matrix, and a machine learning map 730. The GUI 700 may also indicate performance 740 (e.g., inference time and peak memory usage, such as ROM and/or RAM) of the machine learning component as configured. For example, the performance 740 may be determined by the machine learning design service 328, based on input (e.g., selection of the target device 340, the application constraints, the input data, and/or the one or more parameters), via simulations and/or benchmarks.

Figure 8:
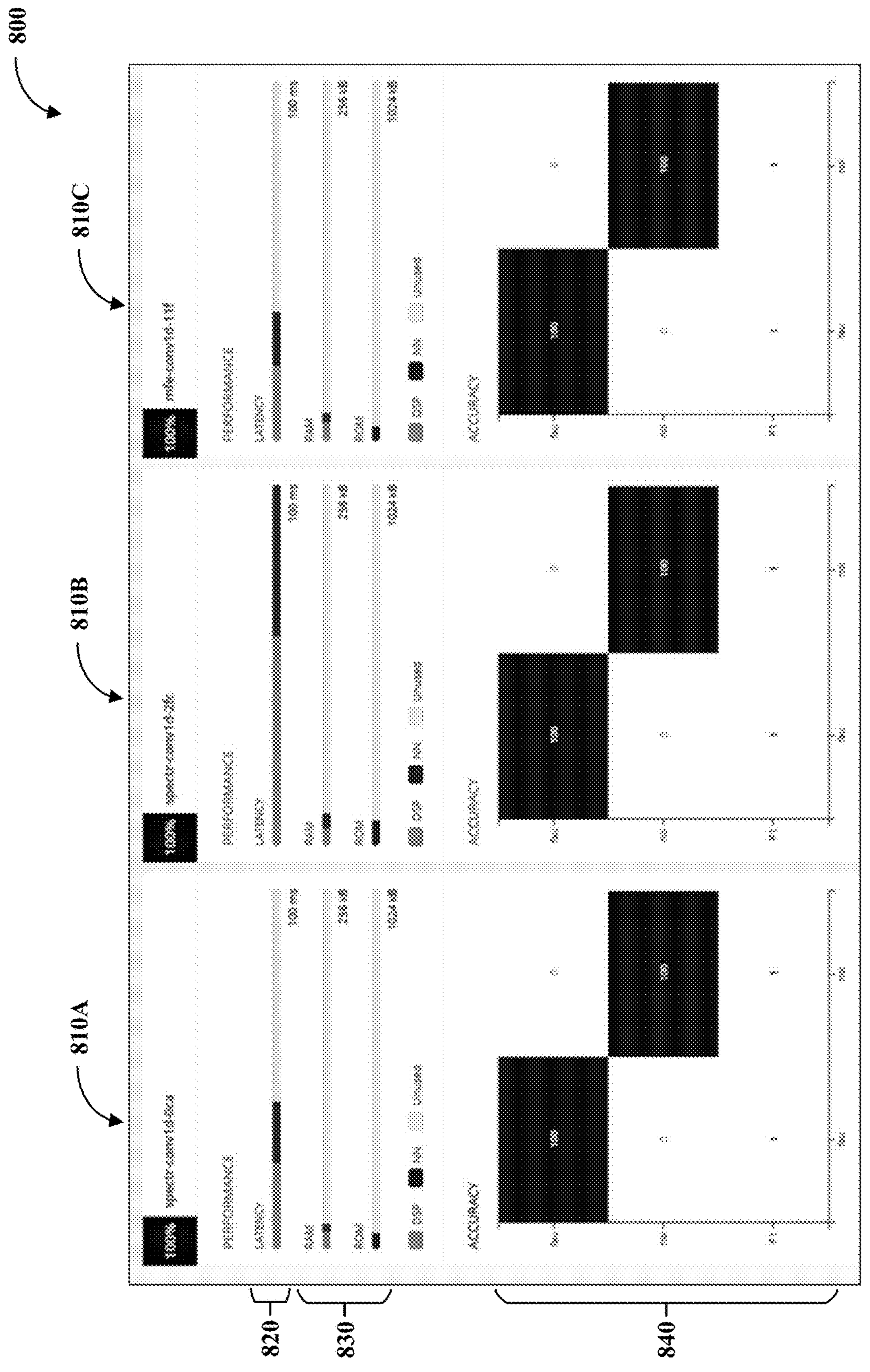
FIG. 8 is an illustration of an example of a GUI indicating performances of multiple configurations of a pipeline.

FIG. 8 is an illustration of an example of a GUI 800 indicating performances of multiple configurations of a pipeline. The GUI 800 could be output for display at a user interface like the user interface 212 shown in FIG. 2. For example, the GUI 800 could be output for display to a user at a design control system like the design control system 320 shown in FIG. 3. The information associated with the GUI 800 may be accessible via an API.

The GUI 800 may indicate performances, such as performances 810A through 810C. The performances 810A through 810C may be associated with varying configurations of the pipeline (e.g., varying based on parameters). For example, the performance 810A may be associated with a first configuration of the pipeline (e.g., a configuration of the pipeline including a signal processing component with a spectrogram algorithm and a machine learning component with a neural network having two 1D convolution layers and data augmentation); the performance 810B may be associated with a second configuration of the pipeline (e.g., a configuration of the pipeline including a signal processing component with a spectrogram algorithm and a machine learning component with a neural network having four 1D convolution layers and no data augmentation); and the performance 810C may be associated with a third configuration of the pipeline (e.g., a configuration of the pipeline including a signal processing component with an MFE algorithm and a machine learning component with a neural network having three 1D convolution layers and data augmentation). The performances 810A through 810C may be determined by the pipeline design service 314, including based on input from user (e.g., selection of the target device 340, the application constraints, the input data, and/or the one or more parameters), such as via simulation or benchmarks.

Each of the performances 810A through 810C may indicate a latency 820 (e.g., an inference time), a memory usage 830 (e.g., a RAM usage and a ROM usage), and a level of accuracy 840, for their respective configurations when implemented on the target device 340. In some implementations, the performances 810A through 810C may also indicate an energy usage when implemented on the target device 340. In some implementations, the performances 810A through 810C (e.g., the latency 820, the memory usage 830, the energy usage, or the accuracy 840) of the configurations may be determined by simulating the target device 340 implementing each of the configurations (e.g., determining the performances based on characteristics of the target device 340, such as the architecture of a device). In some implementations, the performances 810A through 810C of the configurations may be determined by referencing one or more benchmarks associated with the target device 340 (e.g., predetermined performance data from a look up table or other data structure) and applying the one or more benchmarks to estimate the performance of each configuration when implemented on the target device 340. In some cases, a machine learning model or heuristic algorithm may be used to predict the performance of a configuration based on the one or more benchmarks. This may permit determining performances more quickly when using benchmarks. In some implementations, the configurations may be ranked based on their performances (e.g., indicating a configuration with a higher level of accuracy before indicating a configuration with a lower level of accuracy). In some implementations, the performances 810A through 810C may be compared to an application constraint (e.g., a targeted latency, accuracy, memory usage, and/or energy usage) indicated by the input.

Figure 9:
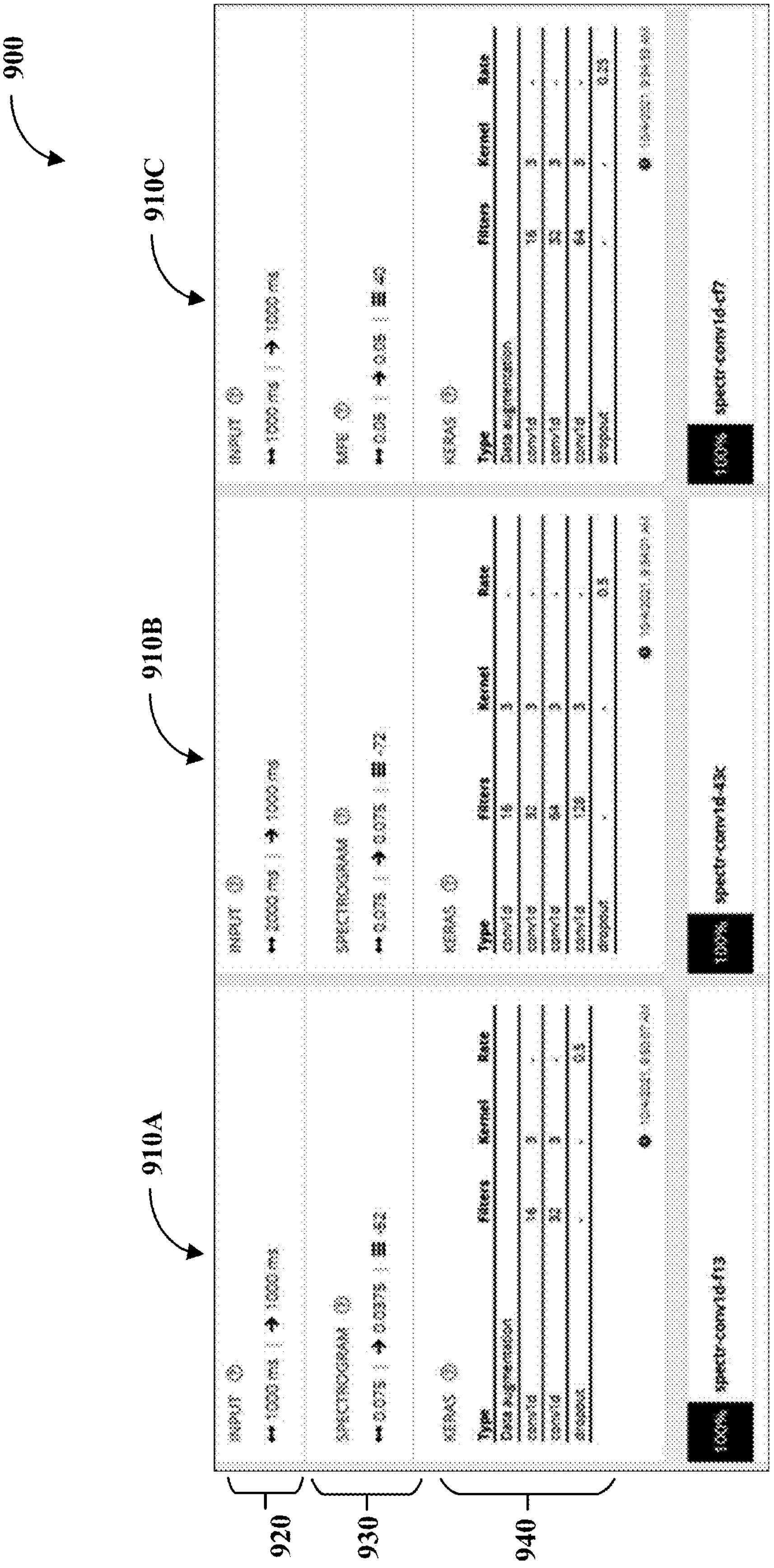
FIG. 9 is an illustration of an example of a GUI indicating multiple configurations of a pipeline.

FIG. 9 is an illustration of an example of a GUI 900 indicating multiple configurations of a pipeline. The GUI 900 could be output for display at a user interface like the user interface 212 shown in FIG. 2. For example, the GUI 900 could be output for display to a user at a design control system like the design control system 320 shown in FIG. 3. The information associated with the GUI 900 may be accessible via an API.

The GUI 900 may indicate multiple configurations of a pipeline, such as configurations 910A through 910C. The configurations 910A through 910C may vary based on parameters and may be associated with varying performances of the pipeline, such the performances 810A through 810C. For example, the configuration 910A (e.g., a configuration of the pipeline including a signal processing component with a spectrogram algorithm and a machine learning component with a neural network having two 1D convolution layers and data augmentation) may be associated with the performance 810A; the configuration 910B (e.g., a configuration of the pipeline including a signal processing component with a spectrogram algorithm and a machine learning component with a neural network having four 1D convolution layers and no data augmentation) may be associated with the performance 810B; and the configuration 910C (e.g., a configuration of the pipeline including a signal processing component with an MFE algorithm and a machine learning component with a neural network having three 1D convolution layers and data augmentation) may be associated with the performance 810C. The configurations 910A through 910C may be determined by the pipeline design service 314, including based on input from a user (e.g., selection of the target device 340, the application constraints, the input data, and/or the one or more parameters). For example, the configurations 910A through 910C may be determined by the signal processing design service 326 and the machine learning design service 328. In some implementations, the GUI 900 and the GUI 800 may be displayed in a combined GUI that indicates the relationships between the performances 810A through 810C and, correspondingly, the configurations 910A through 910C.

Each of the configurations 910A through 910C may include indication of an input configuration 920, a signal processing configuration 930, and a machine learning configuration 940. The input configuration 920 may be based on parameters for the input data used by the data ingestion service 312. The signal processing configuration 930 may be based on parameters for the signal processing component used by the signal processing design service 326. The machine learning configuration 940 may be based on parameters for the machine learning component used by the machine learning design service 328.

Figure 10:
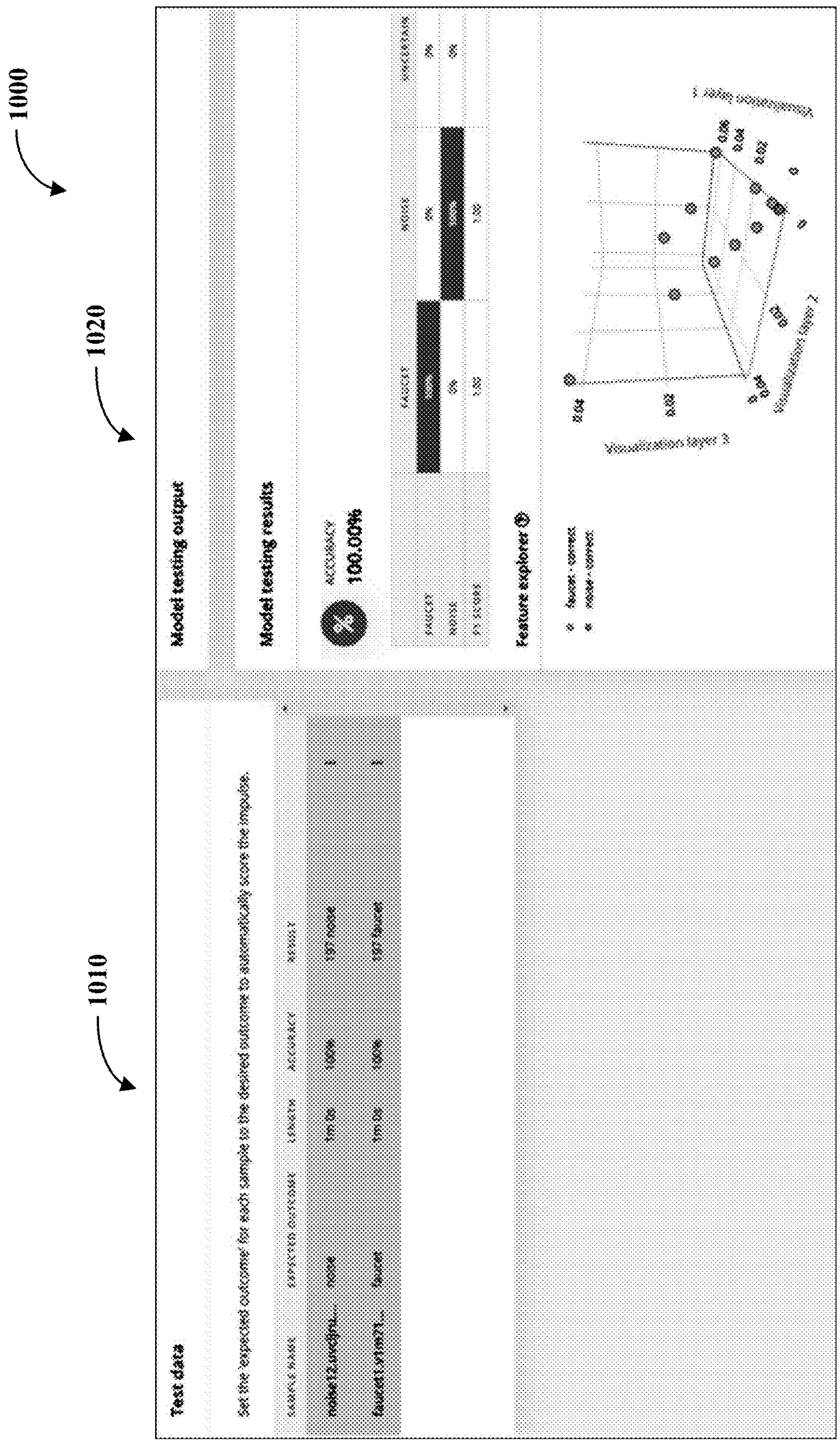
FIG. 10 is an illustration of an example of a GUI indicating testing of a configuration of a pipeline.

FIG. 10 is an illustration of an example of a GUI 1000 indicating testing of a configuration of a pipeline. The GUI 1000 could be output for display at a user interface like the user interface 212 shown in FIG. 2. For example, the GUI 1000 could be output for display to a user at a design control system like the design control system 320 shown in FIG. 3. The information associated with the GUI 800 may be accessible via an API.

The GUI 1000 may indicate test data 1010 used by the test service 316 for a configuration of the pipeline. For example, the test service 316 may use data from datasets stored in the database 324 to test the or more configurations of the pipeline. In one example, the test service 316 may test the one or more configurations of the pipeline with respect to a level of accuracy of predictions. The test service 316 may provide a testing output 1020 to a user, via the design control system 320, so that the user may accept or change a configuration of the pipeline based on the testing. The testing output 1020 may include, for example, a determined level of accuracy and a machine learning map. For example, the testing output 1020 may indicate the test service 316 has determined a level of accuracy of 100% for predictions based on the test data (e.g., classifying a data sample as "faucet," indicating a sound of water running from a faucet, or "noise," indicating a sound other than water running from a faucet.).

Figure 11:
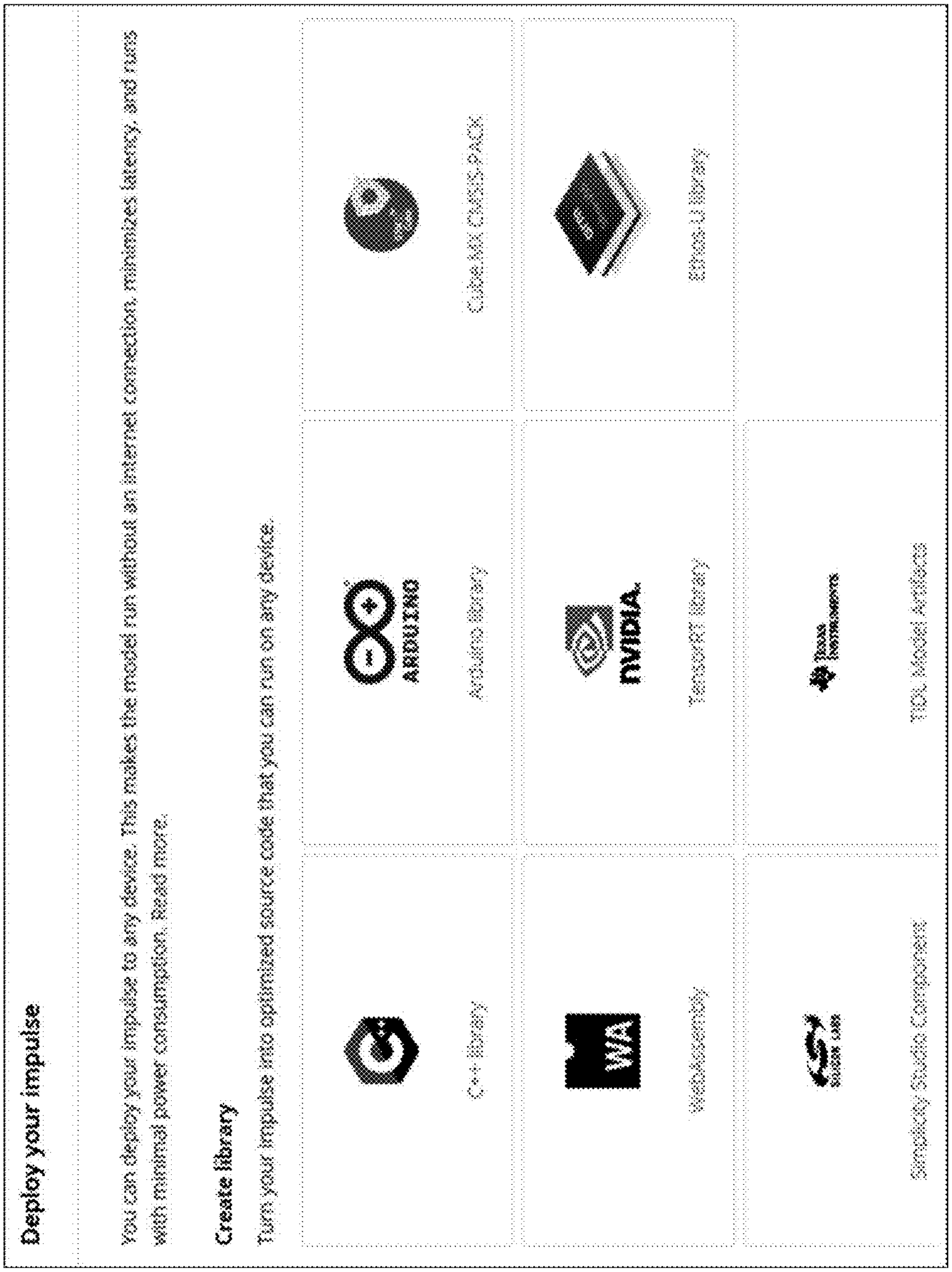
FIG. 11 is an illustration of an example of a GUI indicating deployment of a configuration of a pipeline to a library.

FIG. 11 is an illustration of an example of a GUI 1100 indicating deployment of a configuration of a pipeline to a library. A computer or other device (e.g., the target device 340) may use the library to implement a configuration of the pipeline. The GUI 1100 could be output for display at a user interface like the user interface 212 shown in FIG. 2. For example, the GUI 1100 could be output for display to a user at a design control system like the design control system 320 shown in FIG. 3. The information associated with the GUI 1100 may be accessible via an API.

The GUI 1100 may indicate multiple possible targets that are libraries. For example, possible libraries may could include: a C++ library, Arduino library, Cube.MX CMSIS-PACK, WebAssembly, TensorRT library, Ethos-U library, and Simplicity Studio Component. A user may provide input (e.g., via the design control system 320) to select a library as a target. The deployment service 318 may receive the input and may utilize a software toolchain, specific to the library that is selected, for generating software for deploying a configuration of the pipeline to the library. For example, the deployment service 318 may include a compiler for generating compiled code targeting the library that is selected. A computer or other device (e.g., the target device 340) may use the library to implement a configuration of the pipeline.

Figure 12:
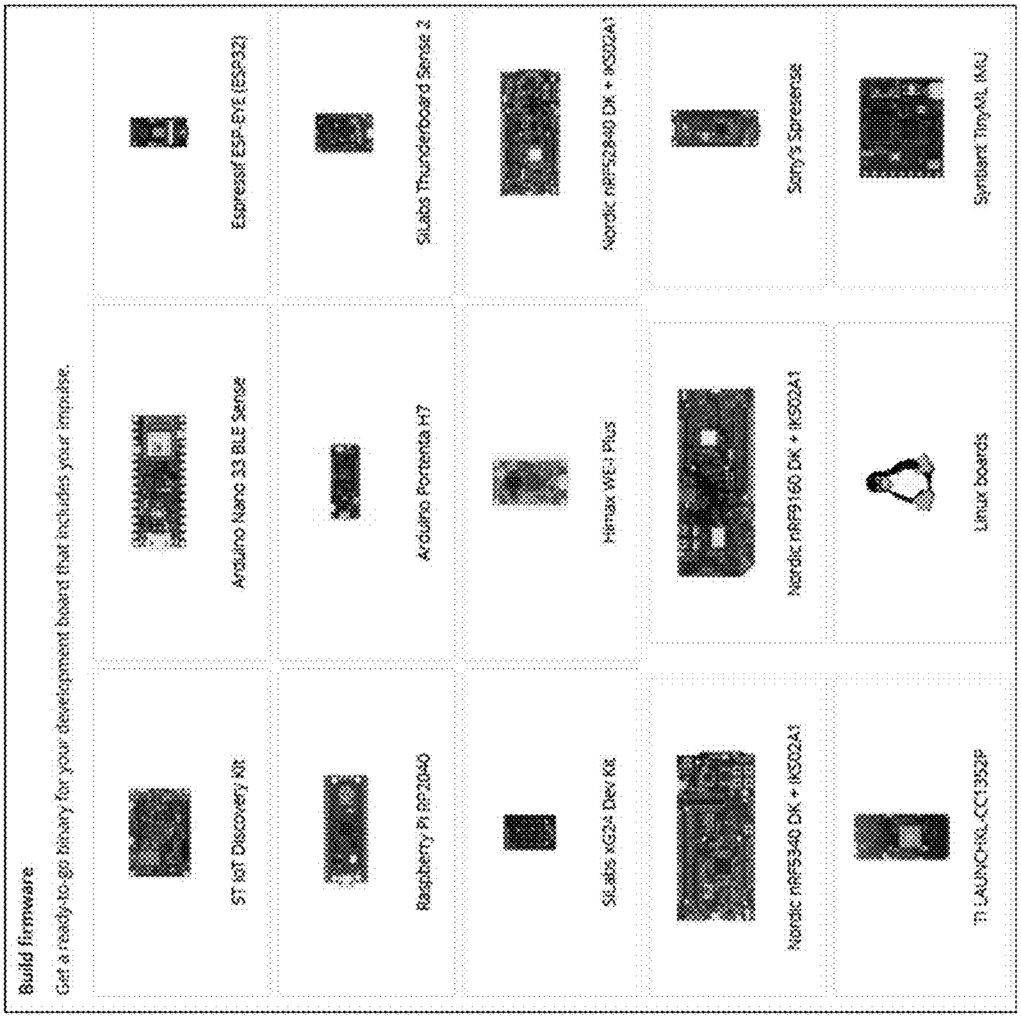
FIG. 12 is an illustration of an example of a GUI indicating deployment of a configuration of a pipeline to a device.

FIG. 12 is an illustration of an example of a GUI 1200 indicating deployment of a configuration of a pipeline to a device (e.g., the target device 340). The GUI 1200 could be output for display at a user interface like the user interface 212 shown in FIG. 2. For example, the GUI 1200 could be output for display to a user at a design control system like the design control system 320 shown in FIG. 3. The information associated with the GUI 1200 may be accessible via an API.

The GUI 1200 may indicate multiple possible target devices comprising microcontrollers or boards in a library. For example, possible target devices in the library could include: an ST IoT Discovery Kit, Arduino Nano 33 BLE Sense, Espressif ESP-EYE (SEP32), Raspberry Pi RP2040, Arduino Portenta H7, SiLabs Thunderboard Sense 2, SiLabs xG24 Dev Kit, Himax WE-I Plus, Nordic nRF52840 DK+IKS02A1, Nordic nRF5340 DK+IKS02A1, Nordic nRF9160 DK+IKS02A1, Nordic Thingy:53, Sony's Spresense, TI LAUNCHXL-CC1352P, and Linux Boards. A user may provide input (e.g., via the design control system 320) to select a microcontroller or board as a target device (e.g., the target device 340). The deployment service 318 may receive the input and may utilize a software toolchain, specific to the microcontroller or board that is selected, for generating software and/or firmware for deploying a configuration of the pipeline to the microcontroller or board. For example, the deployment service 318 may include a compiler for generating compiled code targeting the microcontroller or board that is selected, including software and/or firmware. In some implementations, the deployment service 318 may communicate with a programming system (e.g., the programming system 132) to send the software and/or firmware to a programming system for programming the microcontroller or board (e.g., programming a flash memory or ROM of the microcontroller).

Figure 13:
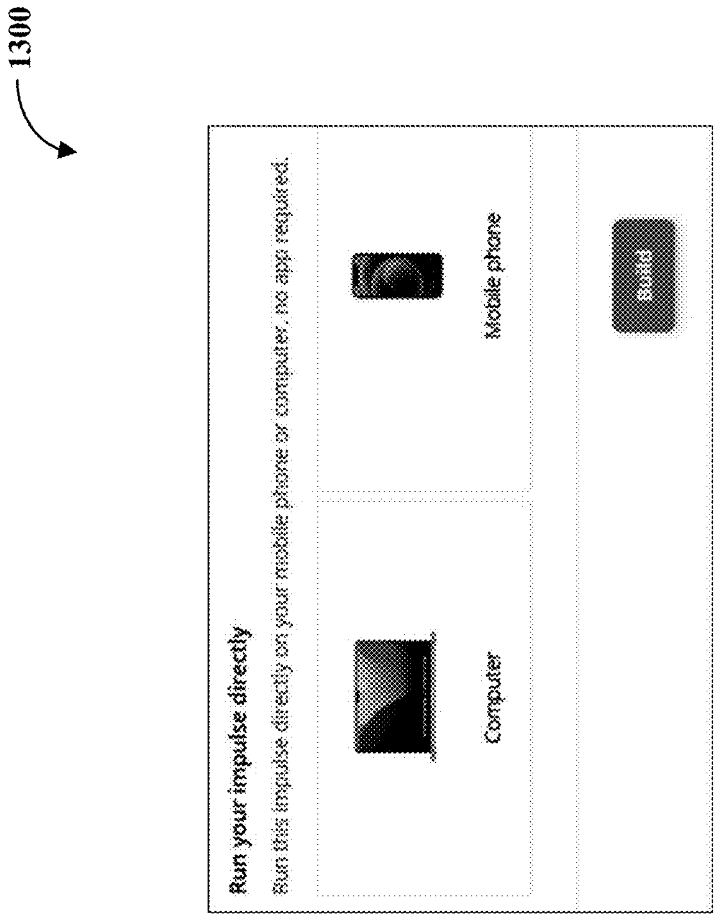
FIG. 13 is an illustration of an example of a GUI indicating deployment of a configuration of a pipeline to a computer or a mobile phone.

FIG. 13 is an illustration of an example of a GUI 1300 indicating deployment of a configuration of a pipeline to a computer or a mobile phone (e.g., the target device 340). The GUI 1300 could be output for display at a user interface like the user interface 212 shown in FIG. 2. For example, the GUI 1300 could be output for display to a user at a design control system like the design control system 320 shown in FIG. 3. The information associated with the GUI 1300 may be accessible via an API.

The GUI 1300 may indicate multiple possible target devices comprising computers or mobile phones in a library. A user may provide input (e.g., via the design control system 320) to select a computer or a mobile phone as a target device (e.g., the target device 340). The deployment service 318 may receive the input and may utilize a software toolchain, specific to the computer or the mobile phone that is selected, for generating software for deploying a configuration of the pipeline to the computer or the mobile phone. For example, the deployment service 318 may include a compiler for generating compiled code targeting the computer or the mobile phone that is selected. In some implementations, the deployment service 318 may communicate with the computer or the mobile phone (e.g., via the network 102) to send the software and/or firmware to the computer or the mobile phone, for the computer or the mobile phone to execute, for implementing the pipeline.

Figure 14:
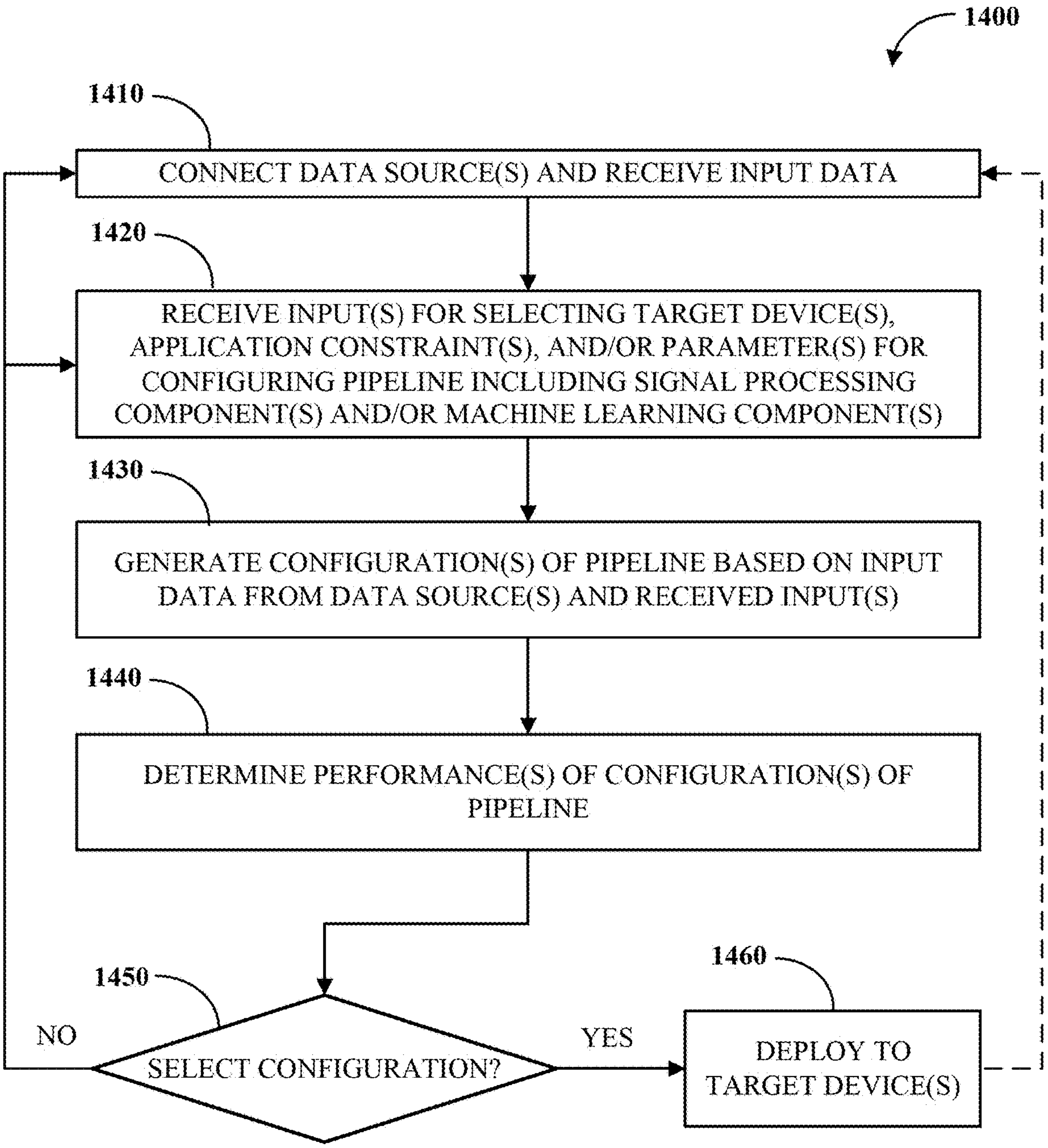
FIG. 14 is a flow chart of an example of a process for configuring a pipeline including a signal processing component and a machine learning component.

To further describe some implementations in greater detail, reference is next made to examples of techniques which may be performed when configuring a pipeline that includes a signal processing component and a machine learning component. FIG. 14 is a flow chart of an example of a technique 1400 for configuring a pipeline that includes a signal processing component and a machine learning component. The technique 1400 can be executed using computing devices, such as the systems, hardware, and software described with respect to FIGS. 1-13. The technique 1400 can be performed, for example, by executing a machine-readable program or other computer-executable instructions, such as routines, instructions, programs, or other code. The steps, or operations, of the technique 1400 or another technique, method, process, or algorithm described in connection with the implementations disclosed herein can be implemented directly in hardware, firmware, software executed by hardware, circuitry, or a combination thereof.

For simplicity of explanation, the technique 1400 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1410, a configuration service (e.g., the configuration service 310) may connect to one or more data sources (e.g., the one or more data sources 330). The configuration service may receive input data, from the one or more data sources, via a data ingestion service (e.g., data ingestion service 312). The data ingestion service that process the input data to generate one or more datasets that may be used to configure, train, and/or test a configuration of the pipeline. The input data may be processed according to a configuration, based on parameters, such as input axes for listing each axis referenced from the training dataset, window size defining the size of the raw features used for the training, window increase to extract multiple overlapping windows from a single sample, and frequency for sampling data. The one or more datasets may be stored by the configuration service in a database (e.g., the database 324). The one or more data sources could be selected and/or configured by a user via a design control system (e.g., the design control system 320). The one or more data sources could also be configured by the configuration service, such as for transferring the input data from the one or more data sources to the configuration service. The one or more data sources may include, for example, one or more servers, computers, mobile phones, or other electronic devices, such as microcontrollers or boards.

At 1420, the configuration service may receive one or more inputs, such as from a user via the design control system. The one or more inputs may include selection of a target device (e.g., the target device 340) from multiple possible target devices, including a microcontroller or board, a computer, or a mobile phone. The one or more inputs may also include an indication of one or more application constraints (e.g., a targeted latency, accuracy, memory usage, and/or energy usage). The one or more inputs may also include input data. The one or more inputs may also include an indication of one or more parameters, and/or a modification of one or more parameters determined by the configuration service, for configuring a pipeline that includes a signal processing component and a machine learning component. For example, the one or more parameters may be used to configure a signal processing component (e.g., settings that affect signal processing calculations, such as a particular DSP algorithm or noise floor) and/or a machine learning component (e.g., settings that affect machine learning, such as hyperparameters including neural network topology, size, or training) of the pipeline.

At 1430, the configuration service may generate multiple configurations of a pipeline based on the one or more inputs (e.g., the target device, the application constraints, the input data, and/or the one or more parameters). For example, a pipeline design service (e.g., the pipeline design service 314) of the configuration service may invoke a signal processing design service (e.g., the signal processing design service 326) and a machine learning design service (e.g., the machine learning design service 328) to generate the multiple configurations of the pipeline. For example, the configuration service may generate multiple configurations like the configurations 910A through 910C shown in FIG. 9.

At 1440, the configuration service may determine the performances of the multiple configurations of the pipeline. For example, the configuration service may determine the performances of the multiple configurations like the performances 810A through 810C shown in FIG. 8. In some implementations, the performance (e.g., the latency, the memory usage, the energy usage, or the accuracy) of a configuration may be determined by simulating the target device implementing the configuration (e.g., determining the performance based on characteristics of the target device, such as the architecture of a microcontroller or board, a computer, or a mobile phone. In some implementations, the performance of a configuration may be determined by referencing one or more benchmarks associated with the target device (e.g., predetermined performance data from a look up table or other data structure) and applying the one or more benchmarks to estimate the performance of the configuration when the target device implements the configuration. In some cases, a machine learning model or heuristic algorithm may be used to predict the performance of the configuration based on the one or more benchmarks. This may permit determining the performance more quickly when using benchmarks. In some implementations, the configurations may be ranked based on their performances. In some implementations, the performance of a configuration may be compared to an application constraint (e.g., a targeted latency, accuracy, memory usage, and/or energy usage) indicated by an input.

At 1450, the configuration service may determine whether a configuration of the multiple configurations is selected. A configuration may be selected, for example, by a user providing input via the design control system. In some implementations, a configuration may be automatically selected, such as when a configuration is determined to satisfy the application constraint. For example, a configuration may be automatically selected based on a rank of the configuration (e.g., a highest ranking accuracy and/or inference time, while satisfying the targeted memory usage and/or energy usage). If a configuration is not selected ("No"), the technique may repeat, such as by returning to 1410 (e.g., to connect another data source and/or receive additional input data) or 1420 (e.g., to receive additional inputs, or changes to inputs). If a configuration is selected ("Yes"), the technique may continue at 1460 in which the configuration may be deployed to the target device. In some implementations, the configuration may be implemented on a target device by utilizing a software toolchain for the target device, such as for generating firmware. In some implementations, implementing the configuration on a target device may include determining portions of the pipeline to be implemented on various cores of a heterogenous device, and distributing a computational workload associated with the pipeline across the various cores. In some implementations, the target device may be implemented in a field system (e.g., the field system 150), and in some cases, the target device may be used to provide input data to the configuration service as a data source, such as for testing the target device when it is implemented and/or implementing a next target device (e.g., a second target device).

As a result, a pipeline including one or more signal processing components and one or more machine learning components may be determined for an application and/or a device while reducing the time and/or the burden associated with making the determination. Further, the pipeline may be implemented on a target device while reducing the time and/or the burden associated with utilizing the software toolchain for the target device. Additionally, by determining configurations that include signal processing and machine learning components, trade-offs between signal processing efficiency (e.g., utilization of the signal processing component) and machine learning efficiency (e.g., utilization of the machine learning component) may be achieved.

Figure 15:
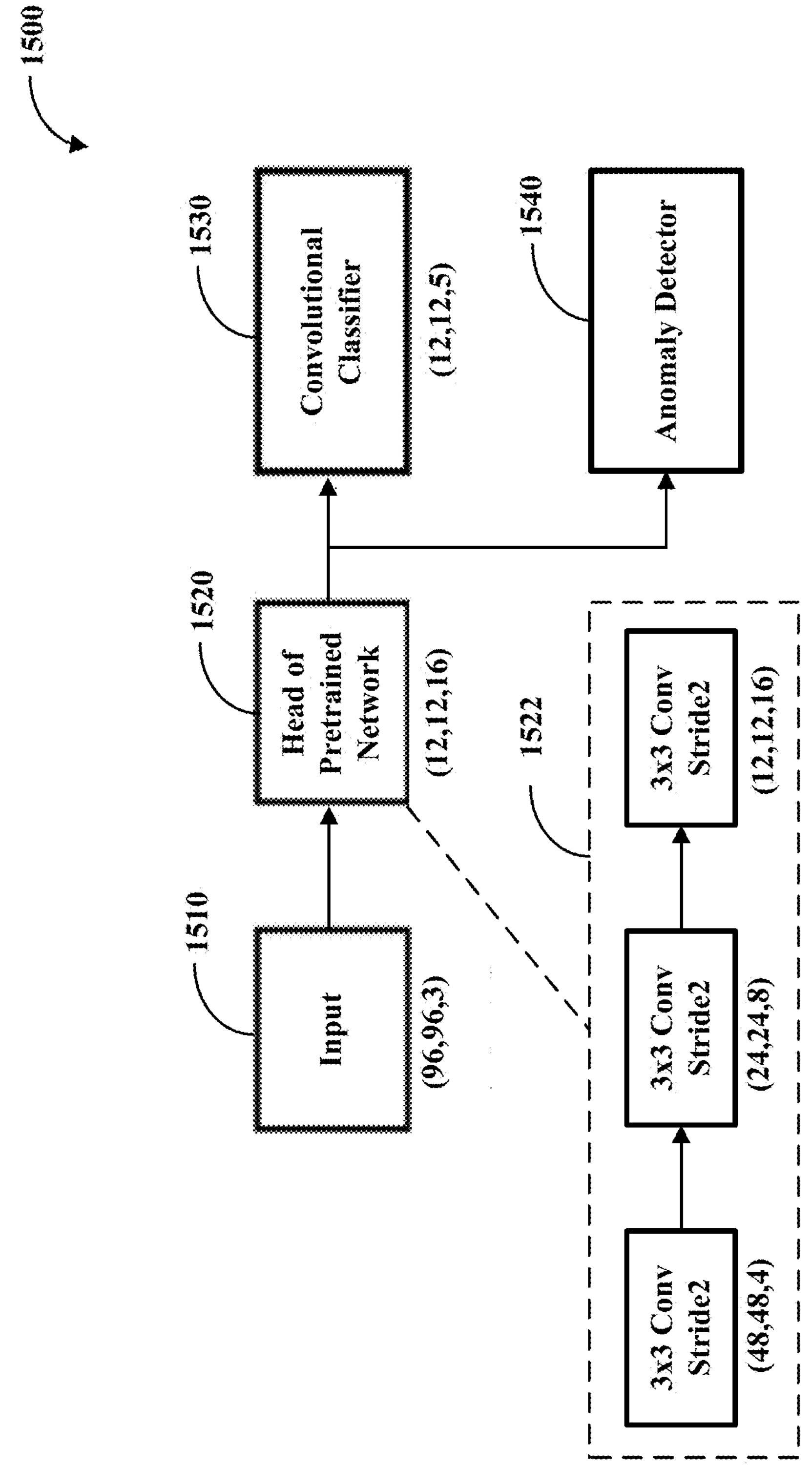
FIG. 15 is a block diagram of an example of an object detection system for an embedded device.

FIG. 15 is a block diagram of an example of an object detection system 1500 for an embedded device. For example, the object detection system 1500 could be implemented by a pipeline configured by the system 100 shown in FIG. 1 and/or the system 300 shown in FIG. 3. The object detection system 1500 could be configured by using the computing device 200 shown in FIG. 2. The object detection system 1500 may be implemented by a signal processing component and/or a machine learning component (e.g., including a neural network) of the pipeline as described herein (e.g., the pipeline could be configured by the pipeline design service 314).

The object detection system 1500 may be configured to provide object detection on an embedded device that is a constrained device (e.g., a microcontroller or other device that is limited or constrained by power, processing speed, and/or memory). The object detection system 1500 may provide object detection by performing discrete object classifications to detect centroids of multiple objects in regions of an image. A system, such as the system 100 shown in FIG. 1 and/or the system 300 shown in FIG. 3, may configure the object detection system 1500 for the embedded device. The object detection system 1500 may be configured to receive an input 1510 including a dataset, such as an image (e.g., which could be from a camera connected to the embedded device). For example, the object detection system 1500 could receive an image could having a resolution of 96 pixels by 96 pixels with each pixel being red, blue, or green (e.g., a 96×96×3 dataset) or black or white (e.g., a 96×96×1 dataset).

The object detection system 1500 may transmit the input 1510 to a pretrained network architecture 1520 for computer vision processing. The pretrained network architecture 1520 may divide, or segment, the image into multiple cells (e.g., segments) arranged in a grid. Each cell of the multiple cells may map to a region of one or more pixels that are adjacent in the image. For example, the pretrained network architecture 1520 may implement a neural network (e.g., which could be implemented by the machine learning component of the pipeline) with one or more convolutional layers and pretrained weights associated with the one or more layers. In some implementations, the pretrained network architecture 1520 may implement a first portion or backbone of a CNN, such as MobileNetV2, that, for each cell, reduces a resolution of a region of one or more pixels in the image. The pretrained network could be a flow generally used to predict an object in the entire image, and the pretrained network architecture 1520 could be limited to a first portion of that flow. For example, the pretrained network architecture 1520 may implement a neural network 1522 that includes a series of three 3×3 convolutional layers, stride 2, to compress the 96 pixels by 96 pixels to a set of 12 by 12 cells (e.g., 144 cells) arranged in a grid with each cell being associated with a 16 bit floating point value (e.g., a 12×12×16 dataset). Each cell may map to a region of the one or more pixels that are adjacent in the image. The size of the region may be configurable according to a given scale. In this example, each region may map to 8 pixels by 8 pixels (e.g., a resolution of 8×8, for a ⅛ scale). However, in other cases, each region may map to a different number of pixels (e.g., the scale could be a ¼ scale, a 1/16 scale, and the like). The neural network 1522 may be trained to detect in each cell either a background or one of multiple objects (e.g., an object classification of N objects, where N is greater than one, plus the background). The background and the objects may be detectable classes that are distinct from one another (e.g., nails, screws, nuts, bolts, or background, for an application that counts building materials). The neural network 1522 may be trained, for example, by a loss function that gives a greater weight to detecting one of the multiple objects and a lesser weight to detecting the background (e.g., balancing what is usually a majority of background in an image).

The object detection system 1500 may transmit data associated with the cells (e.g., from the pretrained network architecture 1520) to a convolutional classifier 1530. The convolutional classifier 1530 could be, for example, a fully convolutional classifier implemented by a series of 2D convolutions (e.g., stride 1, kernel size 1). The convolutional classifier 1530 may classify the detections of the centroids of multiple objects or the background. For example, the convolutional classifier 1530 can determine one of N+1 classifications, which may include multiple (N) user defined classes and an implicit background class (+1), such as one of five classifications for the nails, screws, nuts, bolts, or background for each of the 12 by 12 cells (e.g., 12, 12, 5, where 5 corresponds to the number of classes). The background can be detected when none of the multiple objects are detected (e.g., the background may be an implicit class). The one of the multiple objects (e.g., nails, screws, nuts, bolts) may be detected when a centroid of the one of the multiple objects is detected. By detecting the objects based on centroids, the one of the multiple objects may be efficiently detected without having to determine bounding boxes for the objects. As a result, the object detection system 1500 may provide object detection on an embedded device, limited or constrained by power, processing speed, and/or memory, while maintaining a minimum level of performance (e.g., at least 10 frames per second).

In some implementations, the system may configure the object detection system 1500 to detect anomalies in datasets (e.g., an anomaly detection system). For example, the cells (e.g., from the pretrained network architecture 1520) may be transmitted to an anomaly detector 1540. The anomaly detector 1540 may be in addition to, or in alternative of, the convolutional classifier 1530. In such cases, the object detection system 1500 may be an anomaly detection system (e.g., including the input 1510 for receiving a dataset, such as an image, the pretrained network architecture 1520, and the anomaly detector 1540). The anomaly detection system may use the neural network 1522 to detect, in each cell, data that is either expected data (e.g., the background or the one of the multiple objects) or anomalous data (e.g., data that is not the background or the one of the multiple objects). For example, the neural network 1522 may be trained to compare the data to a statistical distribution (e.g., a bell curve) that is determined when training the neural network 1522. The neural network 1522 can compare the data to the statistical distribution to determine an anomaly score based on a distance of the data from a mean of the curve (e.g., a range). A lesser distance (e.g., within the range) may indicate a lower anomaly score corresponding to expected data (e.g., non-anomalous), while a greater distance (e.g., outside of the range) may indicate a higher anomaly score corresponding to anomalous data. The anomaly detection system may transmit the cells (e.g., from the pretrained network architecture 1520) to the anomaly detector 1540 which may classify the detections as expected data or anomalous data. As a result, the accuracy of detecting data, such as the one of the multiple objects, may be improved for the application.

In some implementations, the system can configure the object detection system 1500 to detect features in other types of datasets (e.g., a feature detection system, or feature detector), as opposed to objects in images. For example, the feature detection system could be configured to detect time-series data from various sensors, such as audio data from a microphone, acceleration data from an accelerometer, proximity data from a proximity sensor, motion-sensing data from a gyroscope, magnetic field data from a magnetometer, and/or ambient light data from an ambient light sensor. For example, the time-series data could be represented as an array of data divided into cells corresponding to time intervals (e.g., as opposed to cells corresponding to pixels in an image).

Figure 16:
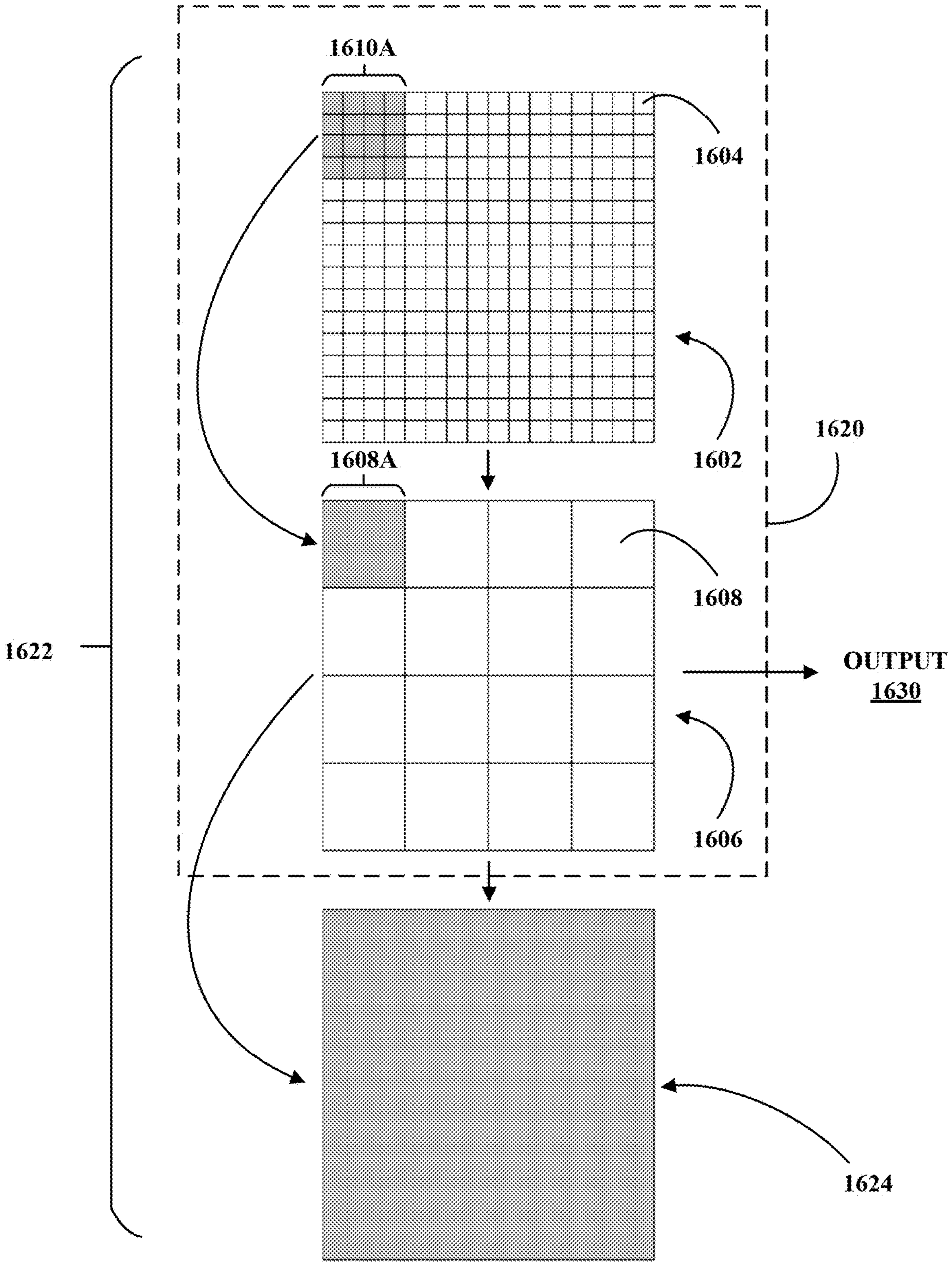
FIG. 16 is a block diagram of an example of an object detection system performing discrete object classifications in regions of an image.

FIG. 16 is a block diagram of an example of an object detection system performing discrete object classifications in regions of an image 1602. For example, the object detection system 1500 shown in FIG. 15 may perform the discrete object classifications. The object detection system may receive the image 1602 as input (e.g., the input 1510). For example, the image could have multiple pixels 1604 at a given image resolution (e.g., 16 pixels by 16 pixels as illustrated, with each pixel being red, blue, or green (e.g., a 16×16×3 dataset) or black or white (e.g., a 16×16×1 dataset). The object detection system may divide, or segment, the image 1602 into a grid 1606. For example, a pretrained network architecture 1620, such as the pretrained network architecture 1520 shown in FIG. 15, may divide the image 1602 into the grid 1606, such as by multiple convolutional layers of a neural network (e.g., the neural network 1522). The grid 1606 may include multiple cells 1608, such as a set of 4 by 4 cells with each cell associated with a multi-bit floating point value (e.g., 4×4×F). Each of the multiple cells 1608 in the grid 1606 may map to a region of one or more pixels 1604 that are adjacent in the image 1602, such as a first cell in the grid 1606 (e.g., indicated by a shaded cell 1608A) mapping to a first region of one or more pixels 1604 in the image 1602 (e.g., indicated by a shaded region 1610A). The size of the region may be configurable according to a given scale. In this example, each region may map to 4 pixels by 4 pixels (e.g., a resolution of 4×4, for a ¼ scale). The object detection system can determine a scale at which the image 1602 is divided into the multiple cells 1608. The scale may be determined, for example, so that different objects of the multiple objects occupy different cells of the multiple cells The pretrained network architecture 1620 may be a first portion of a CNN, such as MobileNetV2 that, for each of the multiple cells 1608, reduces a resolution of the region of one or more pixels 1604 in the image 1602. The pretrained network architecture 1620 could be part of a classifier 1622 that is generally used to predict a single object in the entirety of the image 1602 (e.g., object classification) at a global output 1624. However, the object detection system can bypass the global output 1624, and efficiently use the pretrained network architecture 1620 to instead provide an output 1630 to a convolutional classifier like the convolutional classifier 1530 shown in FIG. 15. The convolutional classifier can classify the detections of centroids of multiple objects or the background in each of the multiple cells 1608 based on the information contained by each of the multiple cells 1608 in the grid 1606. This may enable the background or the one of the multiple objects to be detected in each of the multiple cells 1608 independently and in parallel with one another. The background may be detected when none of the multiple objects are detected, and the one of the multiple objects may be detected when the centroid of the one of the multiple objects is detected. Thus, the object detection system can provide object detection by performing discrete object classifications in the multiple cells 1608 to detect centroids (e.g., as opposed to bounding boxes) of multiple objects (e.g., as opposed to a single object class) in regions of the image 1602.

In some implementations, the output 1630 may be transmitted to an anomaly detector like the anomaly detector 1540 shown in FIG. 15. In some implementations, the output 1630 may be configured to detect features in other types of datasets (e.g., a feature detection system, or feature detector), as opposed to objects in images.

Figure 17:
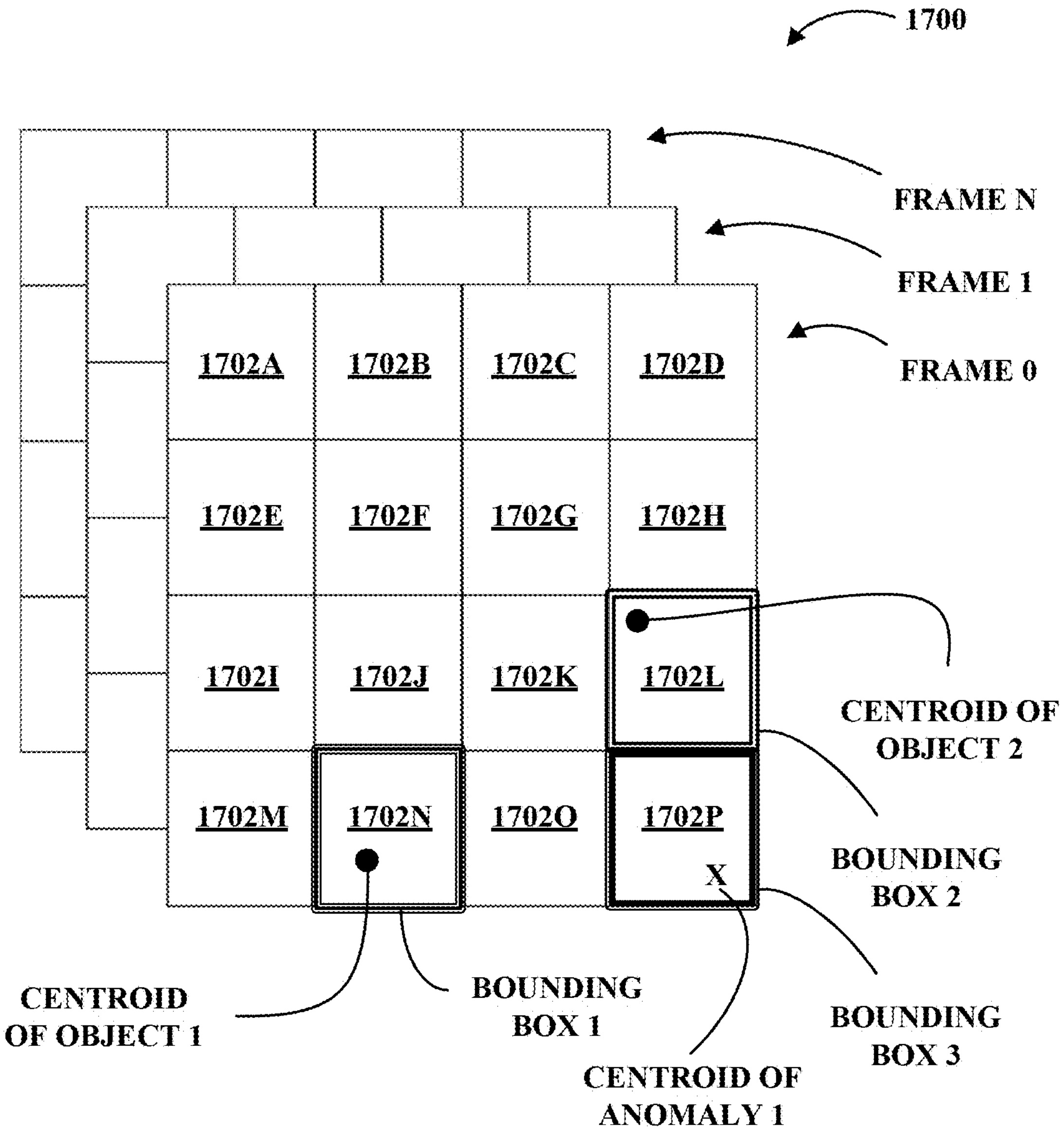
FIG. 17 is a block diagram of an example of detecting centroids of multiple objects in multiple images.

FIG. 17 is a block diagram of an example of detecting centroids of multiple objects in multiple images 1700 (e.g., Frame 0, Frame 1, and Frame N, where N is greater than one). For example, each of the multiple images 1700 could have a resolution of at least 96 pixels by 96 pixels with each pixel being red, blue, or green (e.g., a 96×96×3 dataset). An object detection system (e.g., the object detection system 1500) could be implemented on an embedded device (e.g., a microcontroller), using less than 100 kB of memory, to detect the centroids in the multiple images 1700 at a rate of at least 10 frames per second. The multiple images 1700 could be received from a camera connected to the embedded device that is streaming the images at a continuous video frame rate.

The object detection system may process the multiple images 1700 by dividing each image into multiple cells arranged in a grid, such as cells 1720A-1720P in Frame 0. Each of the multiple cells may map to a region of one or more pixels in the image. The object detection system may detect in each cell either a background or one of multiple objects that are detectable classes distinct from one another (e.g., nails, screws, nuts, or bolts, which may be individually detectable based on training the neural network). One of the multiple objects may be detected in a cell when a centroid of the object is detected based on a probability (e.g., a centroid of nail, a screw, a nut, or a bolt). The background may be detected when none of the multiple objects are detected in a cell. For example, the object detection system may detect a centroid of object 1 in cell 1702N (e.g., a nail), a centroid of object 2 in cell 1702L (e.g., a screw), and a background in cells 1720A-1720K, 1702M, and 17020. The background and the ones of the multiple objects may be advantageously detected in the cells independently and in parallel with one another. For example, the object detection system may detect the centroid of object 1 in cell 1702N, the centroid of object 2 in cell 1702L, and the background in cells 1720A-1720K, 1702M, and 17020, independently and in parallel with one another.

The object detection system limits detection to only one object or the background in a cell. For example, the object detection system may detect the centroid of object 1 in cell 1702N, which may preclude detection of any other objects in cell 1702N, and which may preclude detection of the background in cell 1702L. The object detection system can also determine a scale at which the image is divided into the multiple cells so that different objects occupy different cells (e.g., object 1 occupying the cell 1702N, and object 2 occupying the cell 1702L), and so that multiple objects do not occupy a single cell. One or more of the foregoing aspects may enable the object detection system to process images relatively quickly and efficiently.

In some implementations, if an object is centered on a boundary of multiple cells (e.g., a boundary between cell 1702K and cell 1702L), the object detection system can detect one instance of the centroid in each of the multiple cells (e.g., a first detection of the object in cell 1702K, and a second detection of the object in cell 1702L). This may be useful, for example, for determining any presence of the object in the image with greater sensitivity.

In some implementations, if an object is centered on a boundary of multiple cells (e.g., a boundary between cell 1702K and cell 1702L), the object detection system can fuse the multiple cells, sharing the boundary, together so that the multiple cells operate as a single, fused cell (e.g., a larger cell that is a combination of smaller cells, such as cell 1702K and cell 1702L). The object detection system can then detect one instance of the centroid in the fused cell (e.g., fusing adjacent detections into one). This may be useful, for example, for counting each of the objects in the image with the detections representing the count of the objects. This may enable the number of cells that have detections to be countable, and may avoid "double counting" when an object is centered on a boundary of multiple cells.

Further, the object detection system can detect the ones of the multiple objects without determining bounding boxes for the multiple object. For example, the object detection system may detect the object 1 in cell 1702N based on the centroid of object 1, and may detect the object 2 in cell 1702L based on the centroid of object 2, without regard to first determining bounding boxes that may be arbitrarily sized for the objects 1 and 2. This may also enable the object detection system to process images relatively quickly and efficiently.

In some implementations, after detecting the centroid of an object, the object detection system can assign a bounding box to the cell containing the centroid. For example, after detecting the centroid of object 1 in cell 1702N, and the centroid of object 2 in cell 1702L, the object detection system can assign bounding box 1 to the cell containing the centroid of object 1 (e.g., a bounding box for the cell 1702N, as opposed to the object 1) and bounding box 2 to the cell containing the centroid of object 2 (e.g., a bounding box for the cell 1702L, as opposed to the object 2). Further, the bounding boxes may be distinct from one another based on the objects that are detected. For example, bounding boxes for cells where a centroid of object 1 is detected (e.g., bounding box 1) could be a first color, while bounding boxes for cells where a centroid of object 2 is detected (e.g., bounding box 2) could be a second color. Thus, the sizes of bounding boxes assigned by the object detection system can consistently correspond to the size of each of the multiple cells arranged in the grid, regardless of the bounding boxes corresponding to different objects which may be differently sized. This may provide compatibility for systems that use bounding boxes, while also enabling the object detection system to process images relatively quickly and efficiently by avoiding the determination of different sizes of bounding boxes for differing objects.

In some implementations, an anomaly detection system may detect in each cell of the multiple cells 1702 either expected data (e.g., nails, screws, nuts, or bolts) or anomalous data (e.g., other than nails, screws, nuts, bolts, or background, such as a washer). The data may be expected data when detecting the data within a range determined when training the neural network (e.g., when training to detect nails, screws, nuts, bolts, or the background). The data may be anomalous data when detecting the data outside of the range (e.g., not corresponding to a nail, screw, nut, bolt, or the background, such as a washer). For example, the anomaly detection system may detect a centroid of anomaly 1 in cell 1702P (e.g., a washer), while detecting expected data in the other cells (e.g., the centroid of object 1 in cell 1702N, the centroid of object 2 in cell 1702L, and the background in cells 1720A-1720K, 1702M, and 17020). The expected data or the anomalous data may be detected in each of the multiple cells independently and in parallel with one another. For example, the anomaly detection system may detect the anomalous data in cell 1702P and the expected data in cells 1720A-17200 independently and in parallel with one another.

Further, the anomaly detection system can detect the anomalous data without determining bounding boxes for the anomalous data. For example, the anomaly detection system may detect the anomaly 1 in cell 1702P based on the centroid of anomaly 1, without regard to first determining a bounding box that may be arbitrarily sized for the anomaly 1. This may enable the anomaly detection system to process images relatively quickly and efficiently.

In some implementations, after detecting the centroid of anomalous data, the anomaly detection system can assign a bounding box to the cell containing the centroid. For example, after detecting the centroid of anomaly 1 in cell 1702P, the anomaly detection system can assign bounding box 3 to the cell containing the anomalous data (e.g., the cell 1702P). Bounding boxes for anomalies may be distinct from others bounding boxes, such as bounding boxes for expected data corresponding to objects. For example, bounding boxes that detect the centroid of anomalous data (e.g., bounding box 3) could be a third color, while bounding boxes that detect the centroid of object 1 (e.g., bounding box 1) could be the first color, and bounding boxes that detect the centroid of object 2 (e.g., bounding box 2) could be the second color. Thus, the sizes of bounding boxes assigned by the anomaly detection system can consistently correspond to the size of each of the multiple cells arranged in the grid. This may provide compatibility for systems that use bounding boxes, while also enabling the anomaly detection system to process images relatively quickly and efficiently by avoiding the determination of differing sizes of bounding boxes for differing anomalies.

Figure 18:
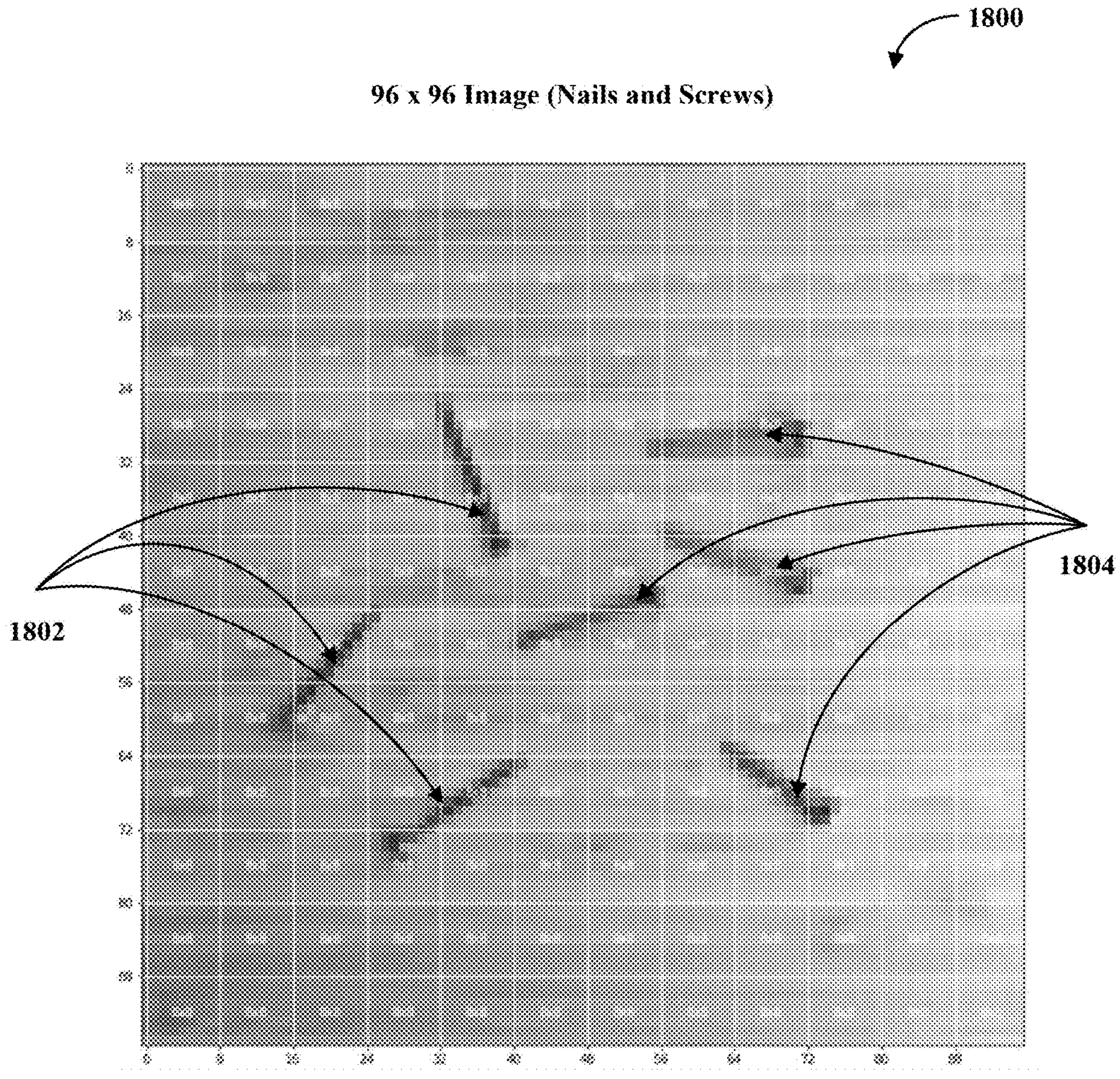
FIG. 18 is a block diagram of an example of detecting centroids of multiple objects in an image at a first scale.

FIG. 18 is a block diagram of an example of detecting centroids of multiple objects in an image 1800 at a first scale. For example, the image 1800 could have a resolution of 96 pixels by 96 pixels (e.g., 96×96) with each pixel being red, blue, or green (e.g., a 96×96×3 dataset) or black and white (e.g., a 96×96×1 dataset). An object detection system (e.g., the object detection system 1500) could determine a scale for dividing the image 1800 into multiple cells arranged in a grid, wherein a cell maps to a region of one or more pixels in the image 1800. In this example, the object detection system may determine the scale to be ⅛ (e.g., each region may map to 8 pixels by 8 pixels), providing 144 distinct cells (e.g., 12 by 12 cells). The object detection system may determine the scale so that different objects detected in the image occupy different cells, and multiple objects do not occupy a single cell, based on the resolution of the image 1800.

For example, the object detection system could be configured to detect one of five classifications (e.g., nails, screws, nuts, bolts, or background) for each of the 12 by 12 cells (e.g., 144 cells). The background may be detected when none of the multiple objects are detected in a cell (e.g., the background may be an implicit class). The one of the multiple objects (e.g., nails, screws, nuts, bolts) may be detected when a centroid of the one of the multiple objects is detected in a cell. In this example, based on the determined scale, the object detection system may detect three centroids of nails 1802 in three distinct cells, and four centroids of screws 1804 in four distinct cells (e.g., no nuts or bolts detected, and no anomalies detected).

Figure 19:
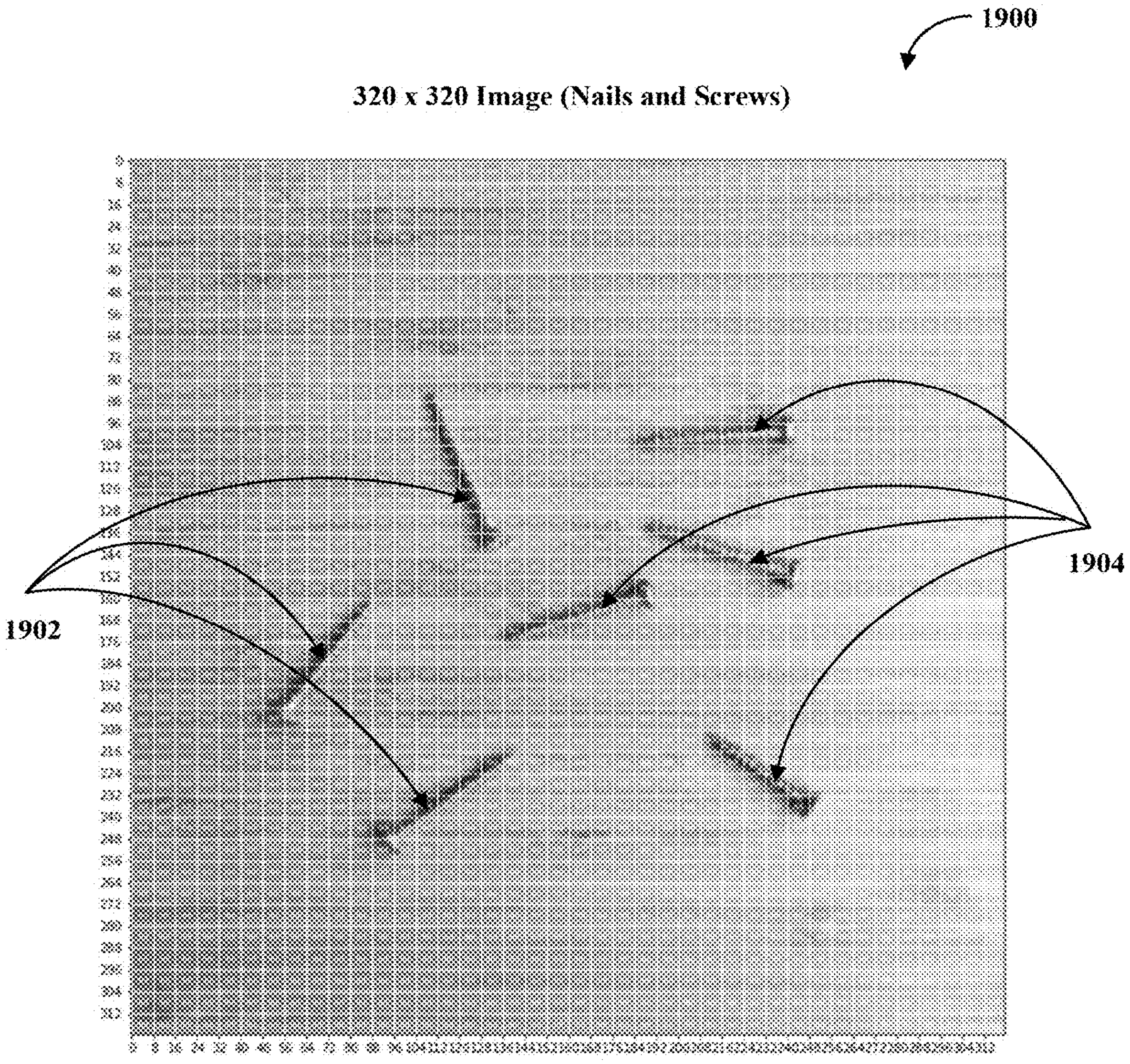
FIG. 19 is a block diagram of an example of detecting centroids of multiple objects in an image at a second scale.

FIG. 19 is a block diagram of an example of detecting centroids of multiple objects in an image 1900 at a second scale. For example, the image 1900 could have a resolution of 320 pixels by 320 pixels (e.g., 320×320) with each pixel being red, blue, or green (e.g., a 320×320×3 dataset) or black and white (e.g., a 320×320×1 dataset). An object detection system (e.g., the object detection system 1500) could determine a scale for dividing the image 1900 into multiple cells arranged in a grid, wherein a cell maps to a region of one or more pixels in the image 1900. In this example, the object detection system may determine the scale to again be ⅛ (e.g., each region may map to 8 pixels by 8 pixels), providing 1,600 distinct cells (e.g., 40 by 40 cells). The object detection system may determine the scale so that different objects detected in the image occupy different cells, and multiple objects do not occupy a single cell, based on the resolution of the image 1900.

For example, the object detection system could be configured to detect one of five classifications (e.g., nails, screws, nuts, bolts, or background) for each of the 40 by 40 cells (e.g., 1,600 cells). The background may be detected when none of the multiple objects are detected in a cell (e.g., the background may be an implicit class). The one of the multiple objects (e.g., nails, screws, nuts, bolts) may be detected when a centroid of the one of the multiple objects is detected in a cell. In this example, based on the determined scale, the object detection system may detect three centroids of nails 1902 in three distinct cells, and four centroids of screws 1904 in four distinct cells (e.g., no nuts or bolts detected, and no anomalies detected). While the scale is again ⅛, the object detection system may detect the objects with a greater location precision in the image 1900 than in the image 1800 based on the greater number of cells associated with the image 1900.

FIG. 20 is an example of a loss function 2000 that gives a greater weight to detecting one of multiple objects and a lesser weight to detecting a background. The loss function 2000 could be implemented by an object detection system like the object detection system 1500 shown in FIG. 15. For example, a neural network, such as the neural network 1522, may be trained using the loss function 2000 to give a greater weight to detecting one of the multiple objects and a lesser weight to detecting the background. This may enable the object detection system to compensate for may often be a majority of background in an image, so as to prevent the neural network from favoring detection of a background over one of the objects (e.g., to prevent achieving a relatively high accuracy by consistently detecting only background, which may occur frequently, at the expense of not detecting objects, which may occur infrequently). The loss function 2000 may give feedback to the neural network to improve the model during training (e.g., adjusting the weights of the model).

As expressed in Python code, "background_loss=tf.nn.weighted_cross_entropy_with_logits" can take a prediction and true values associated with a background and determine how they compare to one another. For example, that may provide a grid (e.g., 12 by 12 cells) with background losses. Further, "non_background_loss=tf.nn.weighted_cross_entropy_with_logits" could similarly take a prediction and true values associated with a non-background (e.g., one of the multiple objects) and determine how they compare to one another. That may provide a grid, but weighted by a positive value (e.g., 100). As a result, there may be two versions of loss calculations. Further, "background_loss*=background_loss_mask" may be used to zero (e.g., mask) cases that are not the background. For example, the zeros may be applied to cells that are not the background to remove from the image the non-background instances (e.g., the objects). Then, and "non_background_loss*=1.0−background_loss_mask" may do the opposite by calculating a loss with 100, then applying zeros to cells that are the background. The calculations can then be summed (e.g., the first part including the background loss, which is the loss with all the background cells with zeros where there is an object, and the second part including the non-background loss, which is the loss with all the object cells with a weight of 100, with zeros where there is background). As a result, the background may have a relatively low loss value for training, whereas non-background or objects may have a relatively high loss value for training. These losses may be element-wise summed to obtain overall losses.

Figure 21:
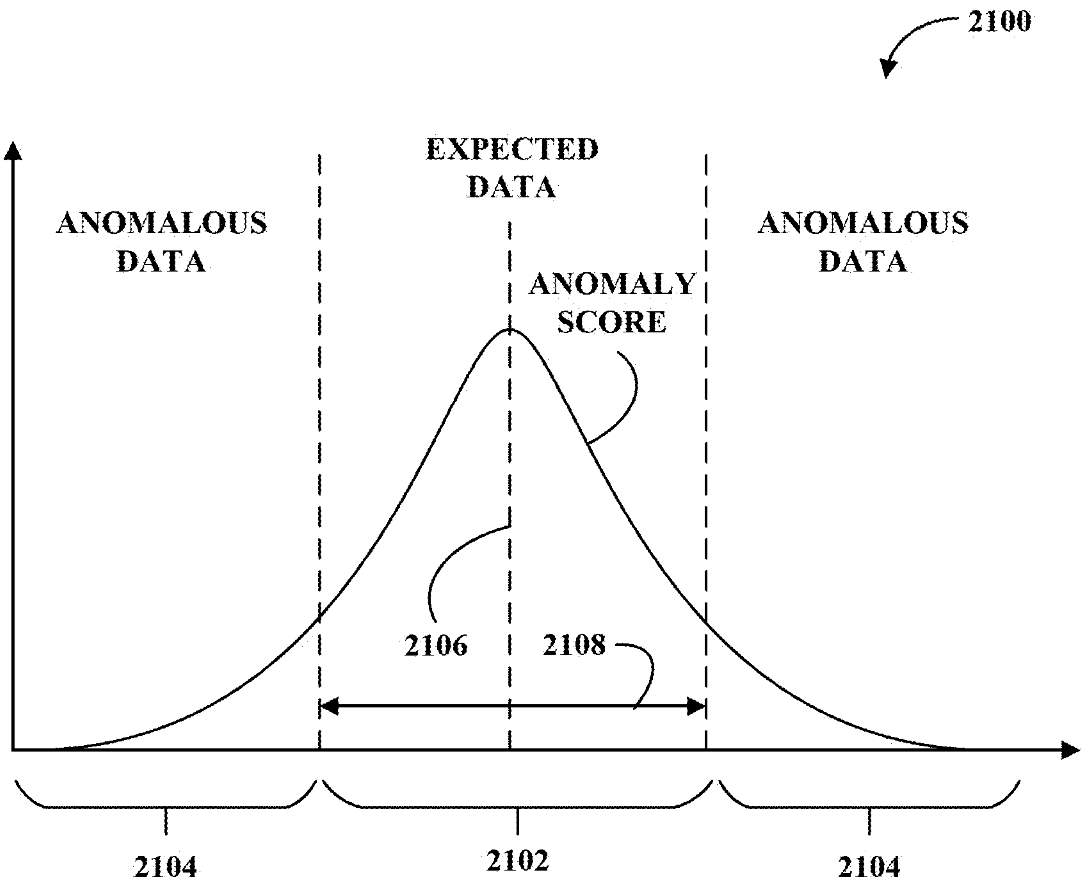
FIG. 21 is a diagram of an example of determining expected data or anomalous data.

FIG. 21 is a diagram of an example of a statistical distribution 2100 for determining expected data or anomalous data. For example, an anomaly detection system including an anomaly detector like the anomaly detector 1540 shown in FIG. 15 may be used to determine expected data 2102 or anomalous data 2104 based on the statistical distribution 2100. The anomaly detection system may detect, in each cell, data that is either the expected data 2102 (e.g., the background or the one of the multiple objects) or the anomalous data 2104 (e.g., other than the background or the one of the multiple objects). For example, the anomaly detection system can compare the data to the statistical distribution 2100 (e.g., a bell curve) that is determined when training the neural network (e.g., the neural network 1522). The anomaly detection system can compare the data to the statistical distribution 2100 to determine an anomaly score (e.g., a position on the curve) based on a distance of the data from a mean 2106 of the curve (e.g., a range 2108). A lesser distance (e.g., within the range 2108) may indicate a lower anomaly score corresponding to expected data 2102 (e.g., non-anomalous), while a greater distance (e.g., outside of the range 2108) may indicate a higher anomaly score corresponding to anomalous data 2104.

Figure 22:
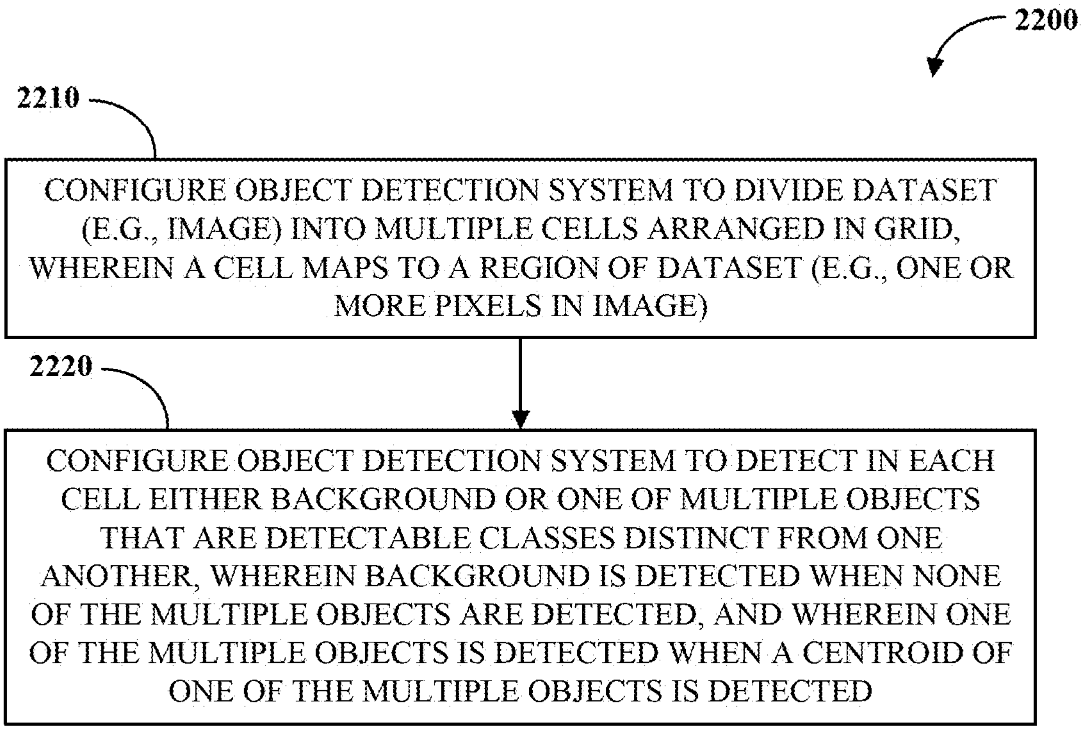
FIG. 22 is a flow chart of an example of a process for configuring an object detection system for an embedded device.

FIG. 22 is a flow chart of an example of a technique 2200 for configuring an object detection system for an embedded device. The technique 2200 can be executed using computing devices, such as the systems, hardware, and software described with respect to FIGS. 1-21. The technique 2200 can be performed, for example, by executing a machine-readable program or other computer-executable instructions, such as routines, instructions, programs, or other code. The steps, or operations, of the technique 2200 or another technique, method, process, or algorithm described in connection with the implementations disclosed herein can be implemented directly in hardware, firmware, software executed by hardware, circuitry, or a combination thereof.

At 2210, a system (e.g., the system 100 shown in FIG. 1 and/or the system 300 shown in FIG. 3) can configure an object detection system (e.g., the object detection system 1500) for an embedded device (e.g., a device that is limited or constrained by power, processing speed, and/or memory, such as a microcontroller). The system can configure the object detection system to divide a dataset (e.g., the image 1602) into multiple cells (e.g., the multiple cells 1608) arranged in a grid (e.g., the grid 1606). Each cell may map to a region (e.g., a region like the shaded region 1610A) of the dataset (e.g., one or more pixels in the image). The size of the region may be configurable according to a given scale.

At 2220, the system can configure the object detection system to detect in each cell of the multiple cells either a background or one of multiple objects that are detectable classes distinct from one another. The background may be detected when none of the multiple objects are detected. The one of the multiple objects may be detected when a centroid of the one of the multiple objects is detected. For example, a pretrained network architecture (e.g., t the pretrained network architecture 1520) may implement a neural network (e.g., the neural network 1522) with one or more convolutional layers and pretrained weights associated with the one or more layers. The neural network may be trained to detect in each cell either a background or one of multiple objects (e.g., an object classification of N objects, where N is greater than one, plus the background). The neural network may be trained, for example, by a loss function (e.g., the loss function 2000) that gives a greater weight to detecting one of the multiple objects and a lesser weight to detecting the background. A convolutional classifier (e.g., the convolutional classifier 1530) may classify the detections of centroids of multiple objects or the background. In some implementations, after detecting the background or the one of the multiple objects in a cell, the object detection system can assign a bounding box (e.g., the bounding boxes 1 or 2 shown in FIG. 17) to the cell containing the background or the one of the multiple objects.

In some implementations, the system can configure the object detection system to detect features in datasets other than images (e.g., a feature detection system, or feature detector). For example, the feature detection system could be configured to detect time-series data from various sensors, such as audio data from a microphone, acceleration data from an accelerometer, proximity data from a proximity sensor, motion-sensing data from a gyroscope, magnetic field data from a magnetometer, and/or ambient light data from an ambient light sensor. The time-series data could be represented as an array of data divided into cells corresponding to time intervals.

Figure 23:
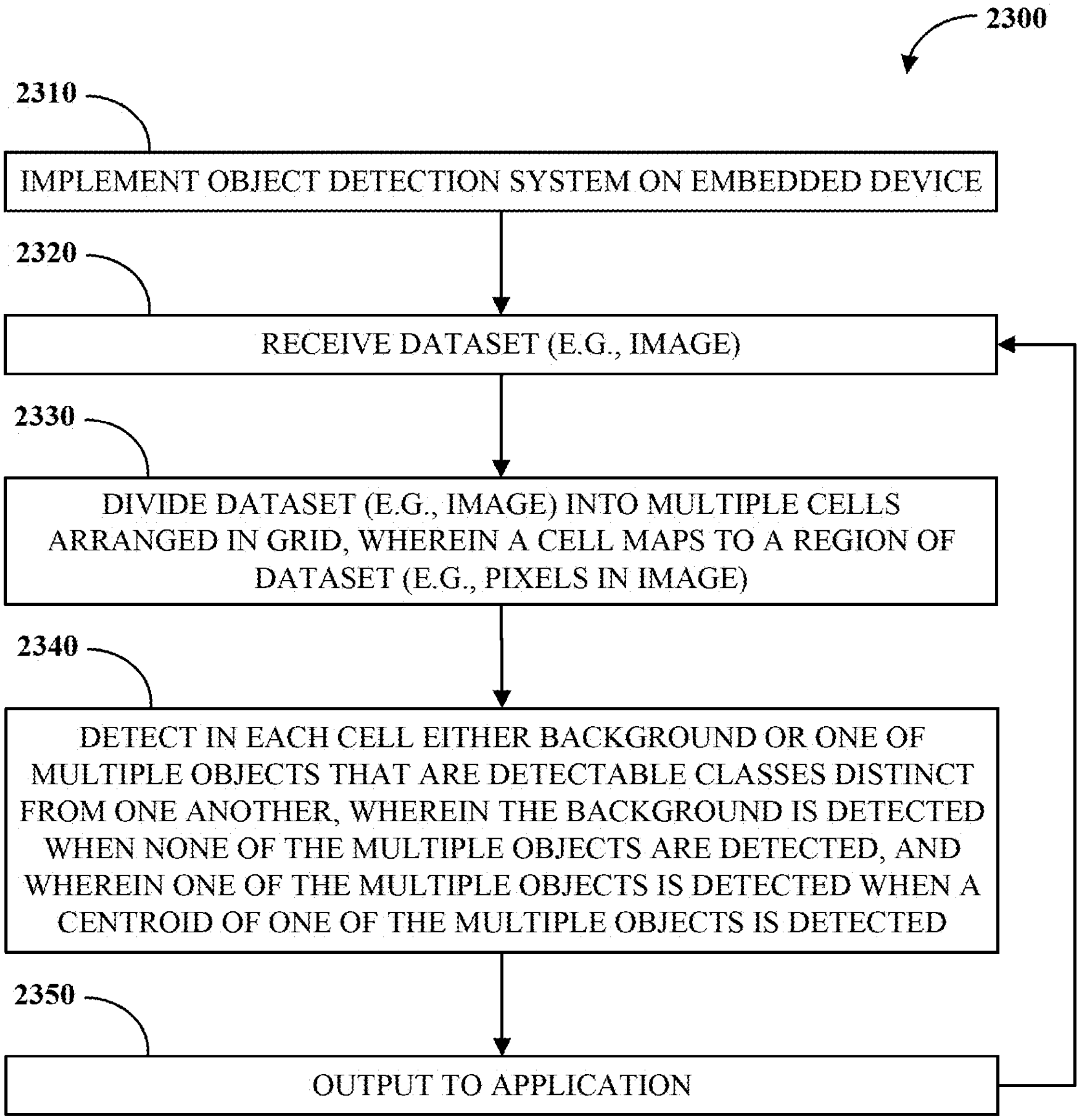
FIG. 23 is a flow chart of an example of a process for using an object detection system on an embedded device.

FIG. 23 is a flow chart of an example of a technique 2300 for using an object detection system on an embedded device. The technique 2300 can be executed using computing devices, such as the systems, hardware, and software described with respect to FIGS. 1-21. The technique 2300 can be performed, for example, by executing a machine-readable program or other computer-executable instructions, such as routines, instructions, programs, or other code. The steps, or operations, of the technique 2300 or another technique, method, process, or algorithm described in connection with the implementations disclosed herein can be implemented directly in hardware, firmware, software executed by hardware, circuitry, or a combination thereof.

At 2310, a system (e.g., the system 100 shown in FIG. 1 and/or the system 300 shown in FIG. 3) can implement an object detection system on an embedded device (e.g., a device that is limited or constrained by power, processing speed, and/or memory, such as a microcontroller). For example, the system 100 shown in FIG. 1 and/or the system 300 shown in FIG. 3 can configure the object detection system (e.g., the object detection system 1500) for the embedded device based on the technique 2200 (e.g., to configure the neural network architecture and weights). In some implementations, the system may implement the object detection system on the embedded device by utilizing a software toolchain, specific to the embedded device, such as by building firmware for the embedded device. For example, the embedded device could be the target device 340 shown in FIG. 3. In some implementations, the object detection system may be compact, using less than 100 kB of memory of the embedded device when implemented and running in the field. The embedded device can then be deployed in a field system like the field system 150 shown in FIG. 1 to execute an application.

At 2320, the embedded device may receive a dataset, such as an image (e.g., the image 1602). The image could be one of many in stream, such as the multiple images 1700. The image could be received from a camera connected to the embedded device. In some implementations, the embedded device may receive other types of datasets, such as time-series data from various sensors (e.g., audio data from a microphone, acceleration data from an accelerometer, proximity data from a proximity sensor, motion-sensing data from a gyroscope, magnetic field data from a magnetometer, and/or ambient light data from an ambient light sensor).

At 2330, the embedded device may use the object detection system to divide the dataset (e.g., the image) into multiple cells (e.g., the multiple cells 1608) arranged in a grid (e.g., the grid 1606). Each cell may map to a region (e.g., a region like the shaded region 1610A) of the dataset (e.g., one or more pixels in the image). The size of the region may be configurable according to a given scale.

At 2340, when receiving an image, the embedded device may use the object detection system to detect in each cell of the multiple cells either a background or one of multiple objects that are detectable classes distinct from one another. The background may be detected when none of the multiple objects are detected. The one of the multiple objects may be detected when a centroid of the one of the multiple objects is detected. For example, a pretrained network architecture (e.g., the pretrained network architecture 1520) may implement a neural network (e.g., the neural network 1522) with one or more convolutional layers and pretrained weights associated with the one or more layers. The neural network may be trained to detect in each cell either a background or one of multiple objects (e.g., an object classification of N objects, where N is greater than one, plus the background). The neural network may be trained, for example, by a loss function (e.g., the loss function 2000) that gives a greater weight to detecting one of the multiple objects and a lesser weight to detecting the background. A convolutional classifier (e.g., the convolutional classifier 1530) may classify the detections of centroids of multiple objects or the background.

In some implementations, the embedded device may use the object detection system to detect features in datasets other than images (e.g., a feature detection system, or feature detector). For example, the feature detection system could be configured to detect time-series data from various sensors, such as audio data from a microphone, acceleration data from an accelerometer, proximity data from a proximity sensor, motion-sensing data from a gyroscope, magnetic field data from a magnetometer, and/or ambient light data from an ambient light sensor. The time-series data could be represented as an array of data divided into cells corresponding to time intervals.

At 2350, the embedded device may output the detections (e.g., the background or the one of multiple objects in each cell) to the application in the field system. The object detection system can then return to 2320 where the embedded device may receive a subsequent dataset to provide subsequent detections, such as a next frame in a video stream. In some implementations, the object detection system may efficiently detect multiple objects in frames at a rate of at least 10 frames per second while using less than the 100 kB of memory.

Figure 24:
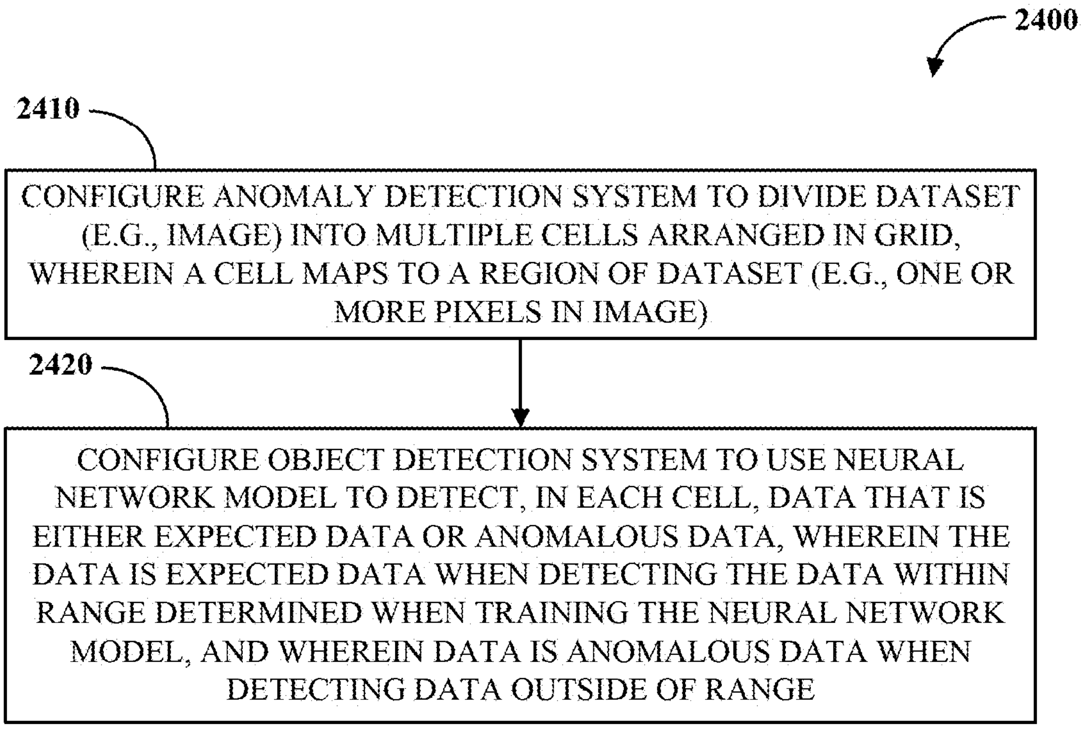
FIG. 24 is a flow chart of an example of a process for configuring an anomaly detection system for an embedded device.

FIG. 24 is a flow chart of an example of a technique 2400 for configuring an anomaly detection system for an embedded device. The technique 2300 can be executed using computing devices, such as the systems, hardware, and software described with respect to FIGS. 1-21. The technique 2300 can be performed, for example, by executing a machine-readable program or other computer-executable instructions, such as routines, instructions, programs, or other code. The steps, or operations, of the technique 2300 or another technique, method, process, or algorithm described in connection with the implementations disclosed herein can be implemented directly in hardware, firmware, software executed by hardware, circuitry, or a combination thereof.

At 2410, a system (e.g., the system 100 shown in FIG. 1 and/or the system 300 shown in FIG. 3) can configure an anomaly detection system (e.g., the object detection system 1500 including the anomaly detector 1540), for an embedded device (e.g., a device that is limited or constrained by power, processing speed, and/or memory, such as a microcontroller). The system can configure the anomaly detection system to divide a dataset (e.g., the image 1602) into multiple cells (e.g., the multiple cells 1608) arranged in a grid (e.g., the grid 1606). Each cell may map to a region (e.g., a region like the shaded region 1610A) of the dataset (e.g., one or more pixels in the image). The size of the region may be configurable according to a given scale.

At 2420, the system can configure the anomaly detection system to use a neural network to detect in each cell of the multiple cells data that is either expected data (e.g., the expected data 2102) or anomalous data (e.g., the anomalous data 2104). The data may be expected data when detecting the data within a range (e.g., the range 2108) that is determined when training the neural network (e.g., the neural network 1522). The data may be anomalous data when detecting the data outside of the range. For example, the anomaly detector may be trained to compare the data to a statistical distribution (e.g., the statistical distribution 2100) that is determined when training the neural network. The anomaly detector can compare the data to the statistical distribution to determine an anomaly score based on a distance of the data from a mean of the curve. A lesser distance (e.g., within the range) may indicate a lower anomaly score corresponding to expected data (e.g., non-anomalous), while a greater distance (e.g., outside of the range) may indicate a higher anomaly score corresponding to anomalous data. In some implementations, after detecting the anomalous data, the anomaly detection system can assign a bounding box (e.g., the bounding box 3 shown in FIG. 17) to the cell containing the anomalous data.

In some implementations, the system can configure the anomaly detection system to detect anomalies in datasets other than images. For example, the anomaly detection system could be configured to detect anomalous data in time-series data from various sensors, such as audio data from a microphone, acceleration data from an accelerometer, proximity data from a proximity sensor, motion-sensing data from a gyroscope, magnetic field data from a magnetometer, and/or ambient light data from an ambient light sensor. The time-series data could be represented as an array of data divided into cells corresponding to time intervals.

Figure 25:
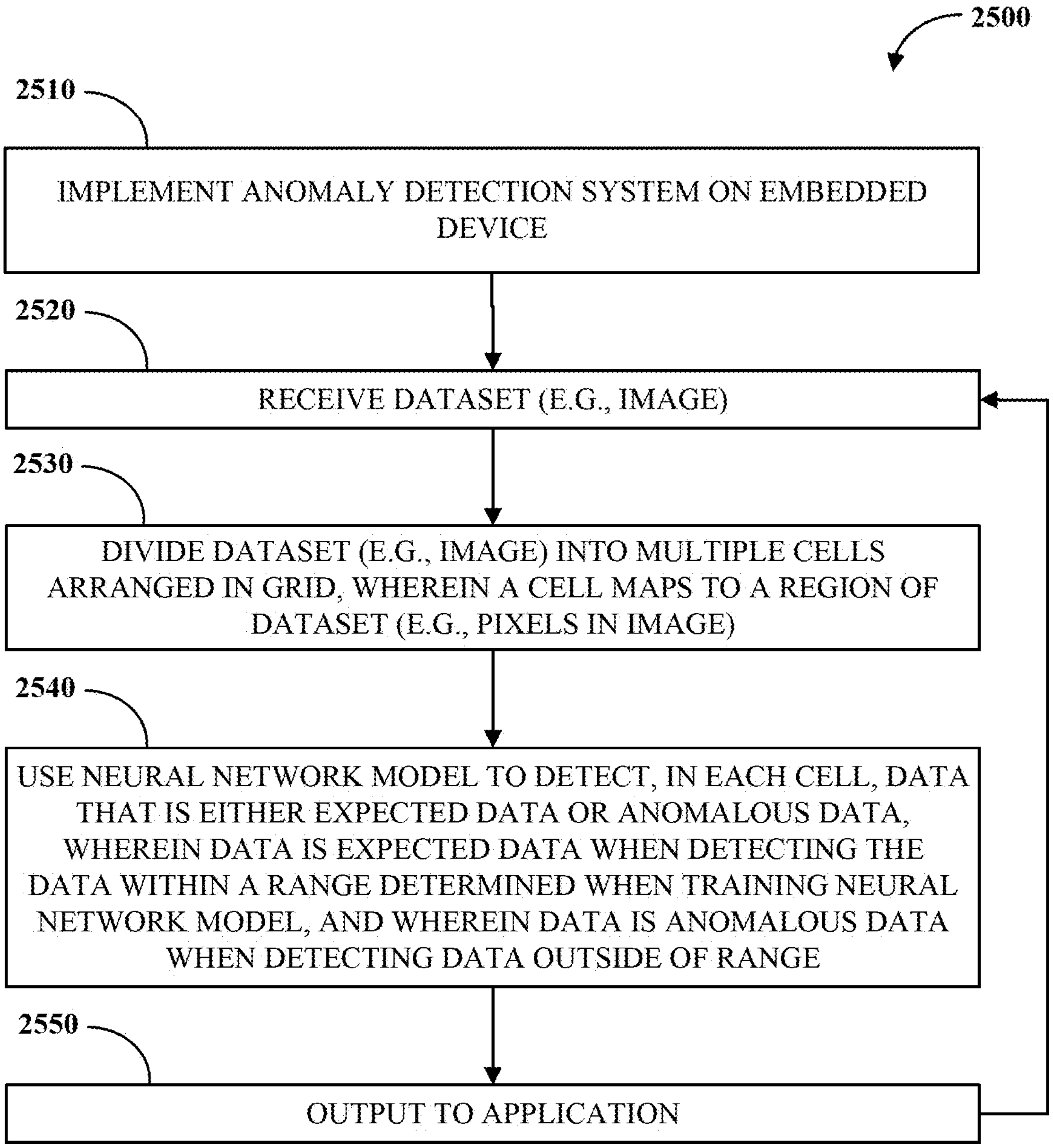
FIG. 25 is a flow chart of an example of a process for using an anomaly detection system on an embedded device.

FIG. 25 is a flow chart of an example of a technique 2500 for using an anomaly detection system on an embedded device. The technique 2500 can be executed using computing devices, such as the systems, hardware, and software described with respect to FIGS. 1-21. The technique 2500 can be performed, for example, by executing a machine-readable program or other computer-executable instructions, such as routines, instructions, programs, or other code. The steps, or operations, of the technique 2500 or another technique, method, process, or algorithm described in connection with the implementations disclosed herein can be implemented directly in hardware, firmware, software executed by hardware, circuitry, or a combination thereof.

At 2510, a system (e.g., the system 100 shown in FIG. 1 and/or the system 300 shown in FIG. 3) can implement an anomaly detection system on an embedded device (e.g., a device that is limited or constrained by power, processing speed, and/or memory, such as a microcontroller). For example, the system 100 shown in FIG. 1 and/or the system 300 shown in FIG. 3 can configure the anomaly detection system (e.g., the object detection system 1500 including the anomaly detector 1540) for the embedded device based on the technique 2400 (e.g., to configure the neural network architecture and weights). In some implementations, the system may implement the anomaly detection system on the embedded device by utilizing a software toolchain, specific to the embedded device, such as by building firmware for the embedded device. For example, the embedded device could be the target device 340 shown in FIG. 3. In some implementations, the anomaly detection system may be compact, using less than 100 kB of memory of the embedded device when implemented and running in the field. The embedded device can then be deployed in a field system like the field system 150 shown in FIG. 1 to execute an application.

At 2520, the embedded device may receive a dataset, such as an image (e.g., the image 1602). The image could be one of many in stream, such as the multiple images 1700. The image could be received from a camera connected to the embedded device. In some implementations, the embedded device may receive other types of datasets, such as time-series data from various sensors (e.g., audio data from a microphone, acceleration data from an accelerometer, proximity data from a proximity sensor, motion-sensing data from a gyroscope, magnetic field data from a magnetometer, and/or ambient light data from an ambient light sensor).

At 2530, the embedded device may use the anomaly detection system to divide the dataset (e.g., the image) into multiple cells (e.g., the multiple cells 1608) arranged in a grid (e.g., the grid 1606). Each cell may map to a region (e.g., a region like the shaded region 1610A) of the dataset (e.g., one or more pixels in the image). The size of the region may be configurable according to a given scale.

At 2540, the embedded device may use a neural network (e.g., the neural network 1522) to detect, in each cell, data that is either expected data (e.g., the expected data 2102, such as data in the image corresponding to the background or the one of the multiple objects) or anomalous data (e.g., the anomalous data 2104, such as data in the image that does not correspond to the background or the one of the multiple objects). For example, the neural network may be trained to compare the data to a statistical distribution (e.g., the statistical distribution 2100) that is determined when training the neural network. The neural network 1522 can compare the data to the statistical distribution to determine an anomaly score based on a distance of the data from a mean of the curve (e.g., a range, such as the range 2108). A lesser distance (e.g., within the range) may indicate a lower anomaly score corresponding to expected data (e.g., non-anomalous), while a greater distance (e.g., outside of the range) may indicate a higher anomaly score corresponding to anomalous data. The anomaly detection system may transmit the cells (e.g., from the pretrained network architecture) to the anomaly detector. The anomaly detector 1540 may classify the detections as expected data or anomalous data. In some implementations, after detecting the anomalous data, the anomaly detection system can assign a bounding box (e.g., the bounding box 3 shown in FIG. 17) to the cell containing the anomalous data.

In some implementations, the embedded device may use the anomaly detection system to detect anomalies in datasets other than images. For example, the anomaly detection system could be configured to detect anomalous data in time-series data from various sensors, such as audio data from a microphone, acceleration data from an accelerometer, proximity data from a proximity sensor, motion-sensing data from a gyroscope, magnetic field data from a magnetometer, and/or ambient light data from an ambient light sensor. The time-series data could be represented as an array of data divided into cells corresponding to time intervals.

At 2550, the embedded device may output the detections (e.g., the expected data or the anomalous data) to the application in the field system. The anomaly detection system can then return to 2520 where the embedded device may receive a subsequent dataset to provide subsequent detections in the subsequent dataset, such as a next frame in a video stream.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an application specific integrated circuit (ASIC)), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method performed by an object detection system of an embedded device, the method comprising:

processing an image using a neural network;

generating, as a result of processing the image using the neural network, a grid including multiple cells, wherein a cell of the multiple cells of the grid maps to a region of one or more pixels in the image;

detecting, in a first cell of the multiple cells, a centroid of an object from multiple objects that are detectable classes distinct from one another;

detecting, in a second cell of the multiple cells, a background based on none of the multiple objects being detected in the second cell;

determining whether at least one of the centroid detected in the first cell or the background is within a range associated with a statistical distribution determined when training the neural network, wherein the centroid or the background is treated as expected data when within the range and is treated as anomalous data when outside the range;

generating a bounding box for the first cell as an object detection output for the object based on detecting the centroid of the object in the cell and based on determining whether at least one of the centroid or the background is within the range, wherein a size of the bounding box corresponds to a size of the cell; and outputting the bounding box as the object detection output for the object.

2. The method of claim 1, wherein the object detection system uses a neural network trained by a loss function that gives a greater weight to detecting the one of the multiple objects and a lesser weight to detecting the background.

3. The method of claim 1, wherein the object detection system uses a neural network implementing one or more convolutional layers that, for each cell of the multiple cells, reduces a resolution of the region of one or more pixels.

4. The method of claim 1, further comprising:

configuring the object detection system to assign a bounding box to a cell when detecting the centroid of the one of the multiple objects in the cell, wherein a size of the bounding box corresponds to a size of the cell.

5. The method of claim 1, further comprising:

configuring the object detection system to detect the background or the one of the multiple objects in each cell of the multiple cells independently and in parallel with one another.

6. The method of claim 1, further comprising:

implementing the object detection system on a microcontroller corresponding to the embedded device; and receiving the image from a camera connected to the microcontroller.

7. The method of claim 1, further comprising:

implementing the object detection system on the embedded device using less than 100 kB of memory;

receiving the image as a first frame of multiple frames with each frame having a resolution of at least 96 pixels by 96 pixels; and detecting the background or the one of the multiple objects in each cell of the multiple frames at a rate of at least 10 frames per second.

8. The method of claim 1, further comprising:

configuring the object detection system to determine a scale at which the image is divided into the multiple cells, wherein the scale is determined so that different objects of the multiple objects occupy different cells of the multiple cells.

9. The method of claim 1, wherein the object detection system is implemented by a pipeline including a signal processing component and a machine learning component.

10. An embedded device of an object detection system, comprising:

a memory; and a processor configured to execute instructions stored in the memory to:

process an image using a neural network;

generate, as a result of processing the image using the neural network, a grid including multiple cells, wherein a cell of the multiple cells of the grid maps to a region of one or more pixels in the image;

detect, in a first cell of the multiple cells, a centroid of an object from multiple objects that are detectable classes distinct from one another;

detect, in a second cell of the multiple cells, a background based on none of the multiple objects being detected in the second cell;

determine whether at least one of the centroid or the background is within a range associated with a statistical distribution determined when training the neural network, wherein the centroid or the background is treated as expected data when within the range and is treated as anomalous data when outside the range, wherein the range;

generate a bounding box for the first cell as an object detection output for the object based on detecting the centroid of the object in the cell and based on determining whether at least one of the centroid or the background is within the range, wherein a size of the bounding box corresponds to a size of the cell; and output the bounding box as the object detection output for the object.

11. The embedded device of claim 10, wherein the processor is configured to use a neural network trained by a loss function that gives a greater weight to detecting the one of the multiple objects and a lesser weight to detecting the background.

12. The embedded device of claim 10, wherein the processor is configured to use a neural network implementing one or more convolutional layers that, for each cell of the multiple cells, reduces a resolution of the region of one or more pixels.

13. The embedded device of claim 10, wherein the processor is configured to assign a bounding box to a cell when detecting the centroid of the one of the multiple objects in the cell, wherein a size of the bounding box corresponds to a size of the cell.

14. The embedded device of claim 10, wherein the processor is configured to:

configure the object detection system to detect the background or the one of the multiple objects in each cell of the multiple cells independently and in parallel with one another.

15. The embedded device of claim 10, wherein the processor is configured to:

implement the object detection system on a microcontroller corresponding to the embedded device; and receive the image from a camera connected to the microcontroller.

16. The embedded device of claim 10, wherein the processor is configured to:

implement the object detection system on the embedded device using less than 100 KB of memory;

receive the image as a first frame of multiple frames with each frame having a resolution of at least 96 pixels by 96 pixels; and detect the background or the one of the multiple objects in each cell of the multiple frames at a rate of at least 10 frames per second.

17. The embedded device of claim 10, wherein the processor is configured to:

configure the object detection system to determine a scale at which the image is divided into the multiple cells, wherein the scale is determined so that different objects of the multiple objects occupy different cells of the multiple cells.

18. The embedded device of claim 10, wherein the object detection system is implemented by a pipeline including a signal processing component and a machine learning component.

* * * * *